US010800547B1

(12) United States Patent
McGann et al.

(10) Patent No.: US 10,800,547 B1
(45) Date of Patent: Oct. 13, 2020

(54) UNMANNED AERIAL VEHICLE (UAV) RECOVERY SYSTEM

(71) Applicant: The United States of America, as represented by the Secretary of the Navy, Arlington, VA (US)

(72) Inventors: Shawn Kerry McGann, Ridgecrest, CA (US); Nicholas McGaha, Ridgecrest, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 272 days.

(21) Appl. No.: 16/045,525

(22) Filed: Jul. 25, 2018

(51) Int. Cl.
*B64F 1/02* (2006.01)
*F16F 7/116* (2006.01)
*B64C 39/02* (2006.01)

(52) U.S. Cl.
CPC .............. *B64F 1/027* (2020.01); *F16F 7/116* (2013.01); *B64C 39/024* (2013.01); *B64C 2201/182* (2013.01); *F16F 2232/04* (2013.01); *F16F 2236/06* (2013.01); *F16F 2238/026* (2013.01)

(58) Field of Classification Search
CPC ....... B64F 1/02; B64F 1/027; B64C 2201/182
See application file for complete search history.

(56) References Cited

U.S. PATENT DOCUMENTS

| 3,356,319 | A | * | 12/1967 | Fonden | B64F 1/02 244/110 R |
| 3,702,177 | A | * | 11/1972 | Niemkiewicz et al. | B64F 1/02 244/110 A |
| 3,708,039 | A | * | 1/1973 | Germer | B64F 1/02 188/62 |
| 4,056,247 | A | * | 11/1977 | Bernard | B64F 1/02 244/110 C |
| 4,311,290 | A | * | 1/1982 | Koper | B64F 1/02 244/110 R |
| 4,342,539 | A | | 8/1982 | Potter | |
| 4,753,400 | A | * | 6/1988 | Reuter | B64F 1/02 244/110 R |
| 7,066,430 | B2 | * | 6/2006 | Dennis | B64C 39/024 244/110 F |
| 7,114,680 | B2 | * | 10/2006 | Dennis | B64C 39/024 244/63 |
| 7,121,507 | B2 | * | 10/2006 | Dennis | B64C 39/024 244/110 F |

(Continued)

*Primary Examiner* — Joseph W Sanderson
(74) *Attorney, Agent, or Firm* — Naval Air Warfare Center Weapons Division; Jimmy M. Sauz

(57) ABSTRACT

A UAV recovery system. The UAV recovery system may comprise: a mast having a mast pulley with a swivel, a base, upper and lower booms extending somewhat horizontally from the mast, a cable and pulley arrangement, a shock absorber, and a mast cable coupled between the mast pulley and the shock absorber. The cable and pulley arrangement may comprise: upper boom pulleys coupled near an associated end of the upper boom, lower boom pulleys coupled near an associated end of the lower boom, and a cable forming a loop around the upper and lower boom pulleys. The cable and pulley arrangement may also comprise a net for capturing the UAV. The shock absorber may urge the mast to rotate into a neutral position, but permit the mast to rotate not more than a controlled-tensioned position.

20 Claims, 11 Drawing Sheets

(56) References Cited

U.S. PATENT DOCUMENTS

| | | | |
|---|---|---|---|
| 7,175,135 B2 * | 2/2007 | Dennis | B64C 25/68 |
| | | | 244/110 C |
| 7,578,467 B2 | 8/2009 | Goodrich | |
| 7,954,792 B2 | 6/2011 | Adonakis | |
| 8,453,967 B2 * | 6/2013 | Miller | F41H 11/02 |
| | | | 244/110 C |
| 9,669,947 B2 * | 6/2017 | Zwaan | B64C 39/024 |
| 9,862,503 B2 * | 1/2018 | Chavez, Jr. | B64F 1/02 |
| 9,879,777 B2 | 1/2018 | Kobayashi et al. | |
| 9,896,222 B2 * | 2/2018 | Kunz | B64C 25/68 |
| 10,518,902 B2 * | 12/2019 | Briggs | B64C 39/024 |
| 2006/0140718 A1 * | 6/2006 | Lamore | E01F 13/028 |
| | | | 404/6 |
| 2011/0303789 A1 * | 12/2011 | Miller | B64F 1/02 |
| | | | 244/110 C |
| 2015/0076285 A1 * | 3/2015 | Chavez, Jr. | B64C 39/024 |
| | | | 244/116 |
| 2016/0016675 A1 * | 1/2016 | Zwaan | B64F 1/02 |
| | | | 244/110 C |
| 2016/0144980 A1 * | 5/2016 | Kunz | B64C 25/68 |
| | | | 244/110 C |
| 2016/0251088 A1 | 9/2016 | Melish et al. | |
| 2018/0086481 A1 * | 3/2018 | Briggs | B64C 39/024 |

* cited by examiner

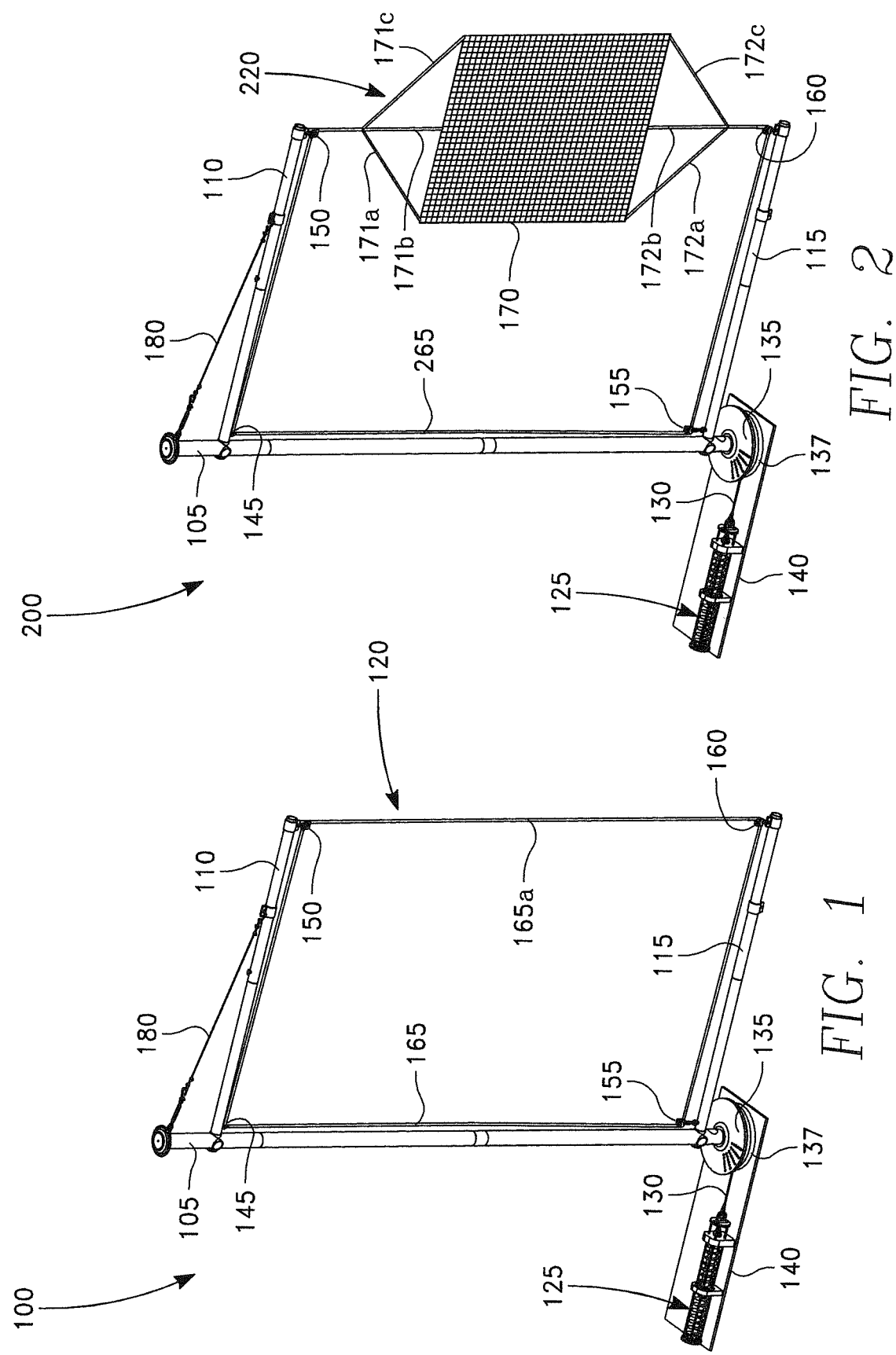

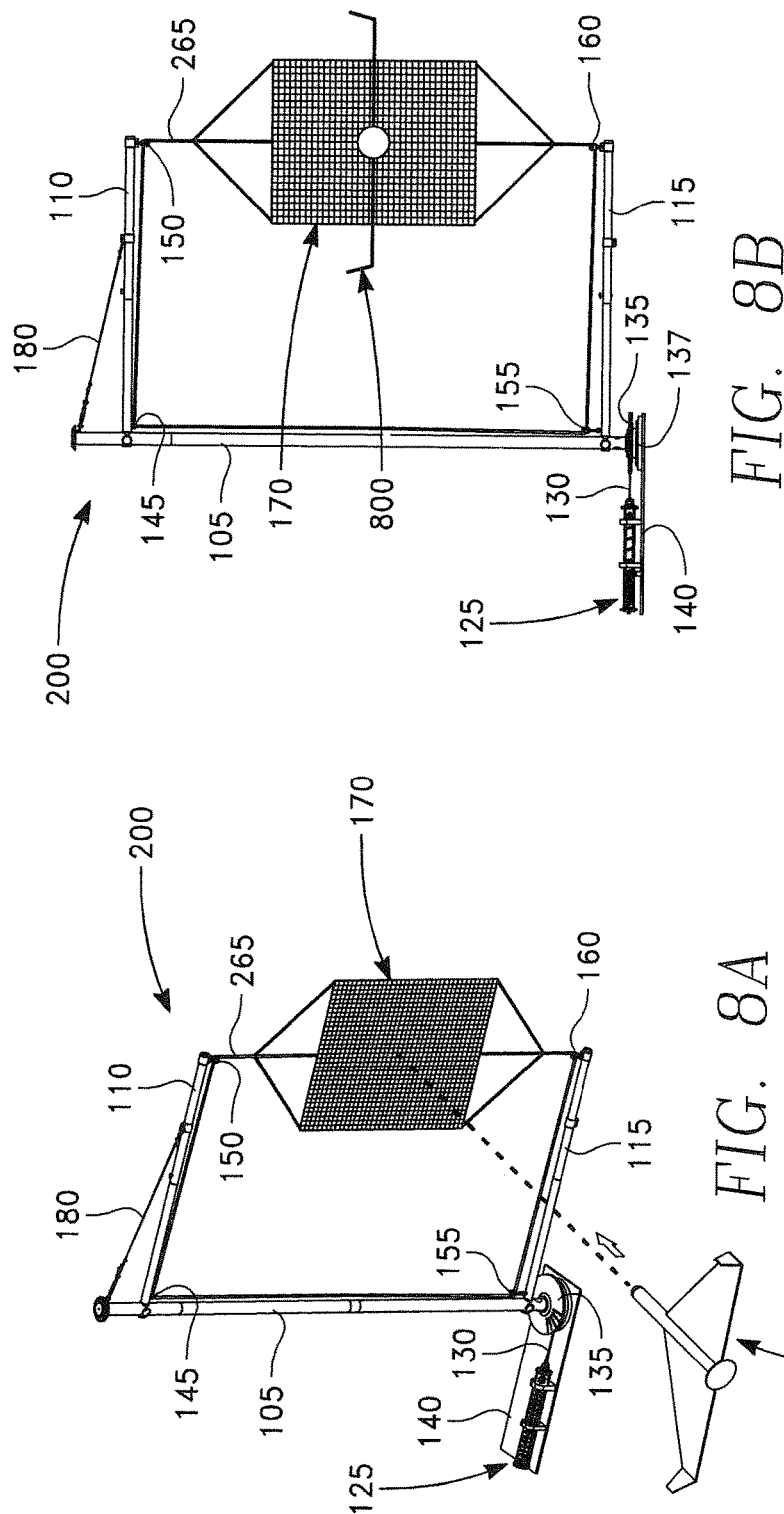
FIG. 8A
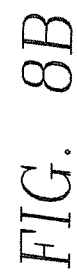
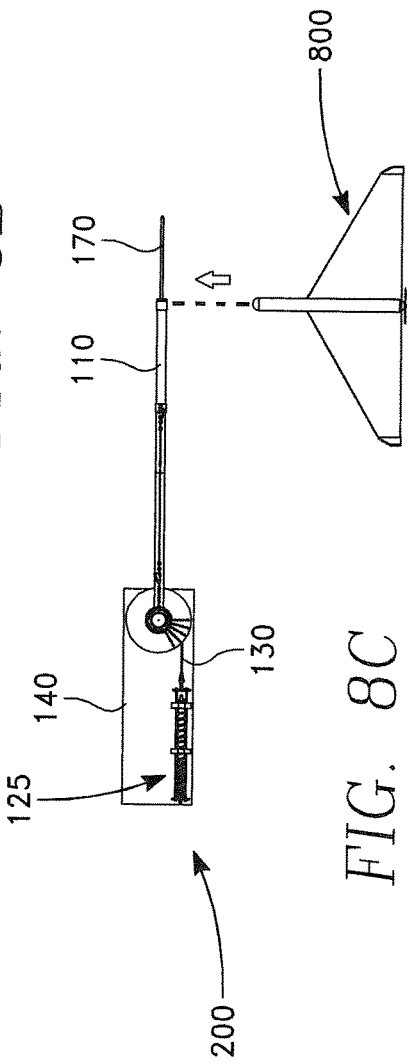
FIG. 8B
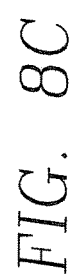
FIG. 8C

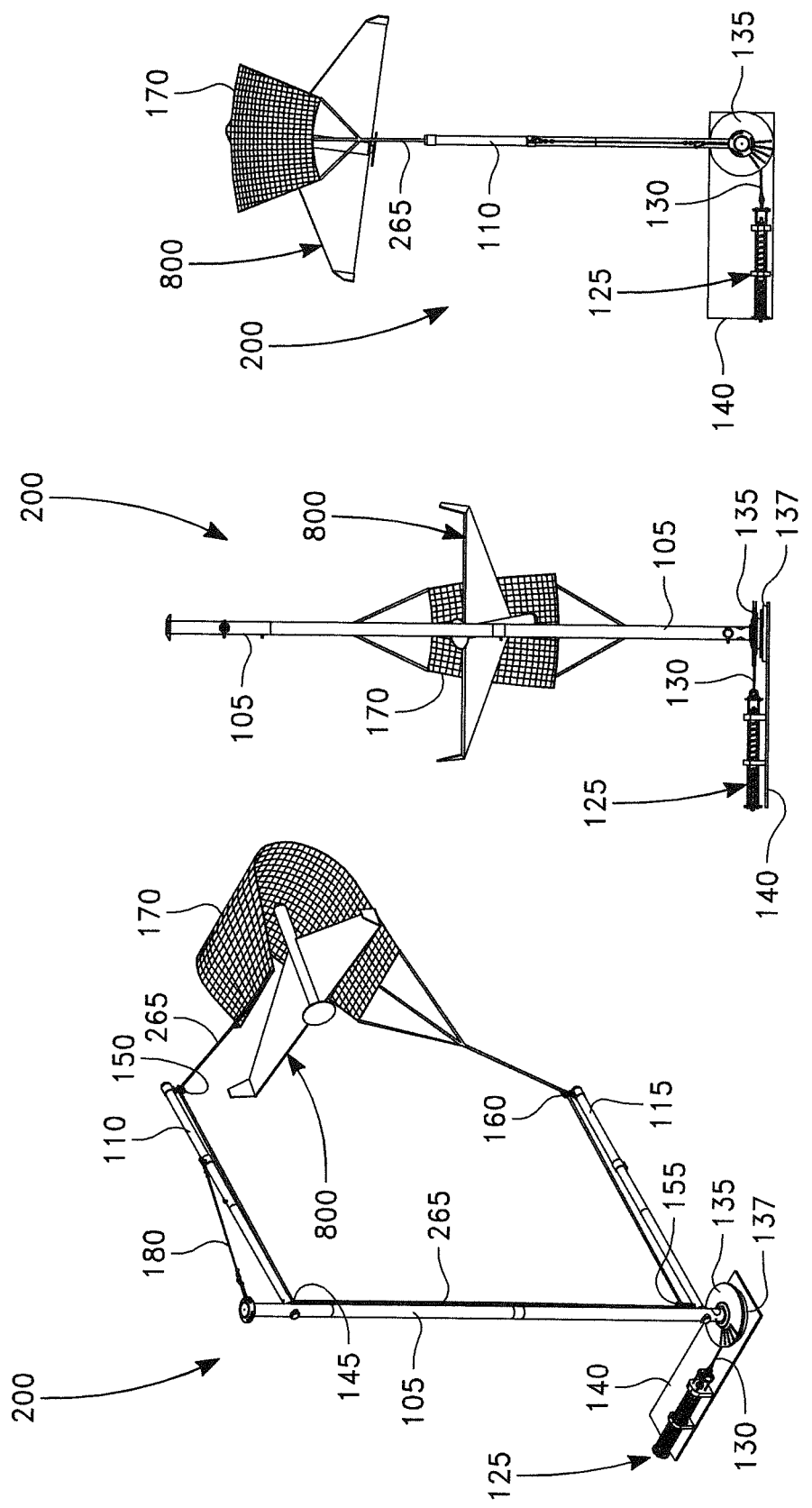

UNMANNED AERIAL VEHICLE (UAV) RECOVERY SYSTEM

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD

The present disclosure relates generally to recovery systems for unmanned aircraft such as unmanned aerial vehicles (UAV) or unmanned aerial systems (UAS).

BACKGROUND

Unmanned aircraft such as UAVs are typically aircraft that lack a pilot onboard and are usually operated under remote control. Unlike manned aircraft, UAVs are often used for military and commercial applications in environments that are unacceptably too costly and/or dangerous to humans. Examples of such applications may include policing, surveillance, and testing. UAVs, for instance, may be used to detect enemy threats autonomously from aerial vantage points.

Recovery mechanisms for UAVs generally require great care and precision to avoid damage to the UAV. Given that UAVs travel at high speeds (usually greater than 45 mph), it is often desirable to have a recovery system designed to stop or decelerate the UAV within a relatively short distance to prevent damage to the UAV. This may be further complicated where space of the recovery area is limited. A recovery system for a UAV installed onboard a ship, for example, would typically require less area due to the amount of limited deck space on that ship.

Therefore, based on the foregoing, a need exists that overcomes these deficiencies. The present disclosure solves these deficiencies and generally represents a new and useful innovation in recovery systems for UAVs.

SUMMARY OF ILLUSTRATIVE EMBODIMENTS

To minimize the limitations in the related art and other limitations that will become apparent upon reading and understanding the present specification, the following discloses embodiments of a new and useful unmanned aerial vehicle (UAV) recovery system.

One embodiment may be an unmanned aerial vehicle (UAV) recovery system, comprising: a mast coupled to a mast pulley having a swivel and adapted to rotate about a fixed axis of rotation; a base coupled to the swivel; upper and lower booms extending somewhat horizontally from the mast; a cable and pulley arrangement, comprising: first and second upper boom pulleys, each coupled near an associated end of the upper boom; first and second lower boom pulleys, each coupled near an associated end of the lower boom; and a cable forming a loop and extending around the first and second upper boom pulleys and the first and second lower boom pulleys; a shock absorber coupled to the base; and a mast cable having a first cable end coupled to the mast pulley and a second cable end coupled to the shock absorber. The shock absorber may comprise: a damper having a housing with a fluid cavity extending along a longitudinal axis and a rod adapted to move relative to the housing along the longitudinal axis, the rod having a first rod end disposed within the fluid cavity and a second rod end traversing from the housing along the longitudinal axis; an end plate coupled to the second rod end; first and second mounts for coupling the shock absorber to the base, the first mount having a receptacle configured to engage with the housing; a mast cable interface coupled to the second cable end of the mast cable; a plurality of shafts coupled between the mast cable interface and the end plate, such that the end plate is in physical communication with the mast cable; and a coil spring having a first spring end engaged with a spring seat of the housing and a second spring end engaged with the end plate for biasing the end plate away from the housing along the longitudinal axis, wherein the spring seat of the housing may be engaged with the receptacle of the first mount, such that the coil spring is adapted to bias the end plate away from the first mount. The UAV recovery system may further comprise: a net coupled to the cable and extending somewhat vertically from the upper boom to the lower boom. The base may further comprise two wheel chocks extending laterally from the base. The mast pulley may comprise an adjustable mast cam for the mast cable, the adjustable mast cam comprising: one or more plurality of holes, each of the plurality of holes being arranged radially away from the fixed axis of rotation; and a plurality of adjustable pins adapted to engage with the one or more plurality of holes. The upper boom and the lower boom may be somewhat flexible. The UAV recovery system may further comprise: a guy wire having a first wire end coupled to an upper end of the mast and a second wire end coupled to the upper boom.

Another embodiment may be a UAV recovery system, comprising: a mast coupled to a mast pulley having a swivel, the mast being vertically disposed and adapted to rotate about a fixed axis of rotation; a base coupled to the swivel; upper and lower booms extending somewhat horizontally from the vertically disposed mast; a cable and pulley arrangement, comprising: first and second upper boom pulleys, each coupled near an associated end of the upper boom; first and second lower boom pulleys, each coupled near an associated end of the lower boom; a cable forming a loop and extending around the first and second upper boom pulleys and the first and second lower boom pulleys, the cable having at least one elastic portion; a shock absorber coupled to the base; and a mast cable having a first cable end coupled to the mast pulley and a second cable end coupled to the shock absorber; wherein the shock absorber may be configured to urge the mast to negatively rotate to a neutral position, but adapted to permit the mast to positively rotate not more than a controlled-tensioned position, in response to a tensioning of the mast cable and the urging of the shock absorber. The shock absorber may comprise: a damper having a housing with a fluid cavity extending along a longitudinal axis and a rod slidably engaged with the fluid cavity and adapted to move relative to the housing along the longitudinal axis, the rod having a first rod end disposed within the fluid cavity and a second rod end traversing from the housing along the longitudinal axis; an end plate coupled to the second rod end; first and second mounts for coupling the shock absorber to the base, the first mount having a receptacle configured to engage with the housing; a mast cable interface coupled to the second cable end of the mast cable; a plurality of shafts coupled between the mast cable interface and the end plate, such that the end plate is in physical communication with the mast cable; and a coil spring having a first spring end engaged with a spring seat of the housing and a second spring end engaged with the end plate for biasing the end plate away from the housing along the longitudinal axis, wherein the spring seat of the housing may be engaged with the receptacle of the first mount, such that the coil spring is adapted to bias the end plate away from the first mount. The UAV recovery system may further comprise: a net coupled to the cable and extending somewhat vertically from the upper boom to the lower boom. The base may further comprise two wheel chocks extending laterally from the base. The mast pulley may comprise an adjustable mast cam for the mast cable, the adjustable mast cam comprising: one or more plurality of holes, each of the plurality of holes being spaced about and arranged radially away from the fixed axis of rotation; and a plurality of radially adjustable pins adapted to engage with the one or more plurality of holes. The upper boom and the lower boom may be somewhat flexible. The UAV recovery system may further comprise: a guy wire having a first wire end coupled to an upper end of the mast and a second wire end coupled to the upper boom.

Another embodiment may be a UAV recovery system, comprising: a mast coupled to a mast pulley having a swivel, the mast being vertically disposed and adapted to rotate about a fixed axis of rotation; a base coupled to the swivel; upper and lower booms extending somewhat horizontally from the vertically disposed mast; a cable and pulley arrangement, comprising: first and second upper boom pulleys, each coupled near an associated end of the upper boom; first and second lower boom pulleys, each coupled near an associated end of the lower boom; a cable forming a loop and extending around the first and second upper boom pulleys and the first and second lower boom pulleys, the cable having at least one elastic portion; a mast cable having a first cable end coupled to the mast pulley; a shock absorber, comprising: a damper having a housing with a fluid cavity extending along a longitudinal axis and a rod slidably engaged with the fluid cavity and adapted to move relative to the housing along the longitudinal axis, the rod having a first rod end disposed within the fluid cavity and a second rod end traversing from the housing along the longitudinal axis; an end plate coupled to the second rod end; first and second mounts for coupling the shock absorber to the base, the first mount having a receptacle configured to engage with the housing; a mast cable interface coupled to a second cable end of the mast cable; a plurality of shafts coupled between the mast cable interface and the end plate, such that the end plate is in physical communication with the mast cable; and a coil spring having a first spring end engaged with a spring seat of the housing and a second spring end engaged with the end plate for biasing the end plate away from the housing along the longitudinal axis, wherein the spring seat of the housing is engaged with the receptacle of the first mount, such that the coil spring is adapted to bias the end plate away from the first mount; wherein the coil spring defines an inner diameter and is disposed about an outer periphery of the housing to permit axial movement of the housing within the inner diameter of the coil spring along the longitudinal axis; and wherein the shock absorber is configured to urge the mast to negatively rotate into a neutral position, but adapted to permit the mast to positively rotate not more than a controlled-tensioned position, in response to a tensioning of the mast cable and the urging of the shock absorber. The UAV recovery system may further comprise: a net coupled to the cable and extending somewhat vertically from the upper boom to the lower boom. The base may further comprise two wheel chocks extending laterally from the base. The mast pulley may comprise an adjustable mast cam for the mast cable, the adjustable mast cam comprising: one or more plurality of holes, each of the plurality of holes being spaced about and arranged radially away from the fixed axis of rotation; and a plurality of radially adjustable pins adapted to engage with the one or more plurality of holes. The upper boom and the lower boom may be somewhat flexible. The UAV recovery system may further comprise: a guy wire having a first wire end coupled to an upper end of the mast and a second wire end coupled to the upper boom.

A primary advantage of the UAV recovery system is its ability to utilize cable tension to decelerate and recover a UAV with minimal or no damage. As the aircraft strikes the cable or net of the UAV recovery system, cascading factors may work together to absorb and redistribute the kinetic energy of the aircraft. In particular, during recovery of the UAV, the UAV preferably contacts the cable or net of the UAV recovery system. This may result with cable being paid out and possibly elastic deflection by the upper and lower booms. Importantly, the mast may also perform a positive rotation from its neutral position, causing the mast cable to wind and retract. As the mast cable winds and retracts, rotational energy may be created, causing the shock absorber to perform a compression stroke. The compression stroke then may compress the coil spring and create stored spring energy. At the end of the compression stroke, the mast may halt positive rotation to no more than a controlled-tensioned position. The stored spring energy may then be released from the coil spring, causing the shock absorber to perform a rebound stroke. During rebound, the mast may perform a negative rotation and ultimately return to its neutral position.

It is an object to provide a UAV recovery system with a shock absorber for regulating cable tension of the mast cable. The UAV recovery system may be capable of decelerating an aircraft using a minimal amount of operational footprint while preferably preventing damage to the aircraft due to sudden deceleration.

It is an object to provide a UAV recovery system that is modular for ease of transportability.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears in different drawings, it is intended to refer to the same or like components or steps.

FIG. 1 is an illustration of a perspective view of one embodiment of a UAV recovery system.

FIG. 2 is an illustration of a perspective view of another embodiment of the UAV recovery system and shows the UAV recovery system with a net.

FIGS. 8A to 8C are illustrations of perspective, front elevational, and top plan views of one embodiment of the UAV recovery system and depicts the mast in a neutral position right before contact with the UAV.

FIGS. 10A to 10C are illustrations of a perspective, front elevational, and top plan views of one embodiment of the UAV recovery system and shows the mast in a controlled-tensioned position after contact with the UAV.

DETAILED DESCRIPTION OF ILLUSTRATIVE EMBODIMENTS

Figure 3:
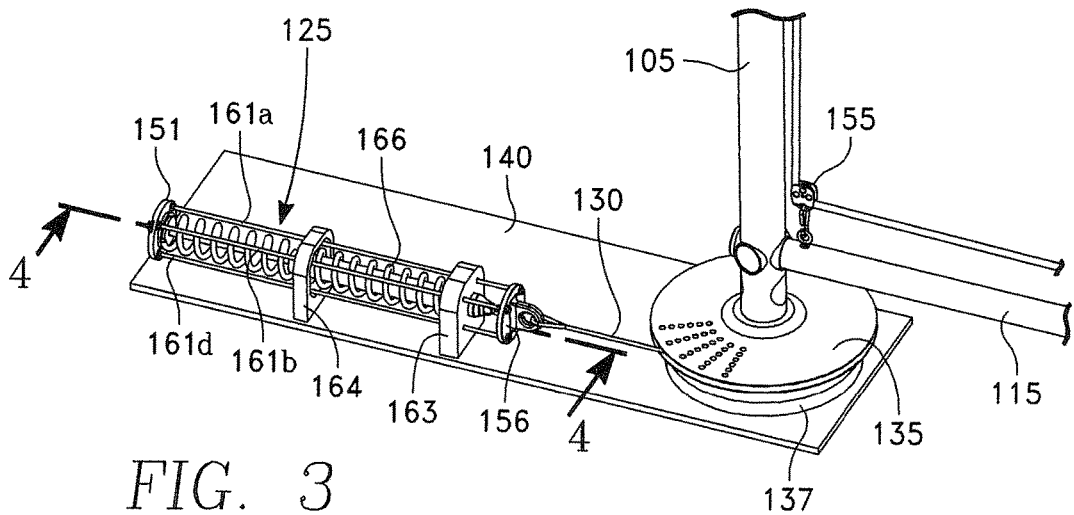
FIG. 3 is an illustration of a perspective view of one embodiment of a shock absorber and base for the UAV recovery system.

In the following detailed description, numerous specific details are set forth in order to provide a thorough understanding of various aspects of one or more embodiments of the unmanned aerial vehicle (UAV) recovery system. However, these embodiments may be practiced without some or all of these specific details. In other instances, well-known methods, procedures, and/or components have not been described in detail so as not to unnecessarily obscure the aspects of these embodiments.

Before the embodiments are disclosed and described, it is to be understood that these embodiments are not limited to the particular structures, process steps, or materials disclosed herein, but is extended to equivalents thereof as would be recognized by those ordinarily skilled in the relevant arts. It should also be understood that terminology used herein is used for the purpose of describing particular embodiments only and is not intended to be limiting.

Reference throughout this specification to "one embodiment," "an embodiment," or "another embodiment" may mean that a particular feature, structure, or characteristic described in connection with the embodiment may be included in at least one embodiment of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in various embodiments. In the following description, numerous specific details are provided, such as examples of materials, fasteners, sizes, lengths, widths, shapes, etc . . . , to provide a thorough understanding of the embodiments. One skilled in the relevant art will recognize, however, that the scope of protection can be practiced without one or more of the specific details, or with other methods, components, materials, etc. . . . . In other instances, well-known structures, materials, or operations are generally not shown or described in detail to avoid obscuring aspects of the disclosure.

Definitions

In the following description, certain terminology is used to describe certain features of the embodiments of a launcher for an unmanned aircraft. For example, as used herein, unless otherwise specified, the terms "unmanned aircraft," "aircraft," "unmanned aerial vehicle," "unmanned aerial system," "UAS," "UAV," and "drone" generally refer to any aircraft capable of being piloted without having a human pilot onboard the aircraft. These aircraft vehicles may be controlled remotely or autonomously via an onboard computer or the like.

As used herein, the terms "pulley," "mast pulley," "upper boom pulley," and "lower boom pulley" generally refer to any wheel or eccentric driven by or driving a cable, rope, or the like and is used to deliver force to a machine, device, or another cable or belt. A pulley may also include wheels that rotate about a fixed axis of rotation and serve to change the direction of or to transmit force (as when one end of the cable is pulled to raise a weight at the other end). In various embodiments, a pulley may include a single wheel or eccentric element, and also may include an assembly of one or more such components. In various embodiments, the pulley, mast pulley, upper boom pulley, and/or lower boom pulley may define a groove, or string track, in which to receive a cable rigging element, that is concentric with an axis of rotation of the wheel. An eccentric may define a groove, or string track for receiving a rigging element, that is spaced by a variable radius from the axis of rotation of the eccentric. Sometimes, an eccentric or wheel may be identified as a "cam" or "adjustable cam" substantially in accordance with its ordinary dictionary meaning.

As used herein, the term "substantially" refers to the complete, or nearly complete, extent or degree of an action, characteristic, property, state, structure, item, or result. As an arbitrary example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "approximately" may refer to a range of values of ±10% of a specific value.

As used herein the term "somewhat" refers to a range of values of ±50% of a specific value.

As used herein, the term "about" is used to provide flexibility to a numerical range endpoint by providing that a given value may be "a little above" or "a little below" the endpoint. In some cases, the term "about" is to include a range of not more than about two inches of deviation.

As an illustration, a numerical range of "about 1 inch to about 5 inches" should be interpreted to include not only the explicitly recited values of about 1 inch to about 5 inches, but also include individual values and sub-ranges within the indicated range. Thus, included in this numerical range are individual values such as 2, 3, and 4 and sub-ranges such as from 1-3, from 2-4, and from 3-5.

Distances, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

This same principle applies to ranges reciting only one numerical value and should apply regardless of the breadth of the range or the characteristics being described.

As used herein in this disclosure, the singular forms "a" and "the" may include plural referents, unless the context clearly dictates otherwise. Thus, for example, reference to a "coil spring" can include reference to one or more of such coil springs.

This disclosure relates generally to recovery apparatuses for unmanned aircraft such as UAVs and unmanned aerial systems (UASs). Embodiments of the UAV recovery system may be designed to recover a UAV with a relative small operational footprint and may be accomplished by applying cable tensioned energy to the aircraft to decelerate the aircraft. This may be achieved by utilizing a shock absorber for tensioning the mast cable during recovery.

In particular, upon recovery of an unmanned aircraft, great care and precision is needed to avoid damage to the aircraft. The aircraft may weigh around 50 pounds or more and may be traveling at speeds of 35 mph or more. Thus, in order to recover the aircraft, the aircraft must also be stopped and landed without damaging the aircraft or inflicting harmful deceleration loads or contact loads on its components or surfaces. In addition, imparting high instantaneous peak forces to the UAV upon contact with the recovery hardware may cause damage to the UAV, resulting with substantial repair costs. This is further complicated when the recovery must occur where space is limited. Thus, recovering a UAV during flight is often very difficult. The embodiments disclosed herein solve this problem by regulating cable tension through the combinational use of a shock absorber, adjustable cam, and/or flexible booms. The UAV recovery system may be designed to recover the UAVs with a relative small footprint and may be accomplished by applying cable tensioned energy to the aircraft for decelerating the aircraft. The UAV recovery system may be modular for ease of transportability.

In the accompanying drawings, like reference numbers generally indicate like elements. Reference character 100 and variations thereof are used to depict embodiments of the UAV recovery system. Several views are presented to depict some, though not all, of the possible orientations of the embodiments of the UAV recovery system.

FIG. 1 is an illustration of a perspective view of one embodiment of a UAV recovery system. As shown in FIG. 1, one embodiment of the UAV recovery system 100 may comprise: a mast 105, upper boom 110, lower boom 115, cable and pulley arrangement 120, shock absorber 125, base 140, and mast cable 130.

The mast 105 may be a support structure upwardly extending relative to the base 140 and may provide vertical support to the upper boom 110, lower boom 115, and cable and pulley arrangement 120. Importantly, the mast 105 may be adapted to rotate about a generally vertical axis. In an exemplary embodiment, the mast 105 may comprise a mast pulley 135 and swivel 137, both of which preferably have a fixed axis of rotation, which may be aligned with the generally vertical axis of the mast 105. In particular, the mast pulley 135 and swivel 137 may be coupled to a lower end of the mast 105, and the swivel 137 may be coupled to the base 140, such that the mast 105 may be configured to rotate about the vertical axis with respect to the base 140.

In some embodiments, the mast 105 may be constructed as a single vertical structure or component. In other embodiments, the mast 105 may comprise one or more tubular sections or members, each of which being coupled to one another or inserted into each other in a telescopic manner. Additionally, in multiple embodiments, the mast 105 may extend vertically at a height between approximately 15 to 25 feet and may weigh between approximately 350 to 450 pounds. In an exemplary embodiment, the mast 105 may have a height of approximately 20 feet and may weigh approximately 400 pounds. The center of gravity of the mast 105 may also be two feet from its center of rotation.

The upper boom 110 and lower boom 115 may be long beams or horizontal supporting arms that are coupled to or projecting from the mast 105. In particular, the upper boom 110 and lower boom 115 may extend somewhat horizontally from the mast 105 and may be used for supporting the cable and pulley arrangement 120. In multiple embodiments, the upper boom 110 and lower boom 115 may be constructed of various high-strength, flexible materials such as para-aramid fibers (Kevlar®), composite, and/or elastomeric materials, allowing the upper boom 110 and lower boom 115 to bend or vary in angle. Additionally, in various embodiments, the upper boom 110 and lower boom 115 may extend between approximately 5 to 15 feet. In an exemplary embodiment, the upper boom 110 and lower boom 115 may each be approximately 12 feet. In some embodiments, the UAV recovery system 100 may also comprise a guy wire 180 that is coupled between the top end of the mast 105 and a portion of the upper boom 110 to provide additional support.

FIG. 1 also depicts a cable and pulley arrangement 120 for hoisting a cable 165 and/or net 170 (shown in FIG. 2) for recovery of the UAV. Specifically, one embodiment of the cable and pulley arrangement 120 shown in FIG. 1, for example, may comprise: a first upper boom pulley 145, second upper boom pulley 150, first lower boom pulley 155, second lower boom pulley 160, and cable 165. The first upper boom pulley 145 and second upper boom pulley 150 may be coupled near or at an associated end of the upper boom 110. Similarly, the first lower boom pulley 155 and second lower boom pulley 160 may be coupled near or at an associated end of the lower boom 115. The cable 165 may be flexible and elastic and may extend around the first upper boom pulley 145, second upper boom pulley 150, first lower boom pulley 155, and second lower boom pulley 160 to form a loop. In another embodiment, the cable and pulley arrangement 220 may also utilize a net 170, as shown in FIG. 2. Although FIG. 1 depicts four pulleys, the number of upper and lower boom pulleys may be selectively varied.

The mast cable 130 may be a physical cord (e.g., rope, cable) coupled between the mast pulley 135 and the shock absorber 125 whereby movement at one end of the mast cable 130 may produce a reciprocal or complementary movement at its opposing end. For example, in a preferred embodiment, the mast cable 130 may have a first cable end attached to the mast pulley 135 and a second end attached to the shock absorber 125. In this manner, the mast pulley 135 may be in physical communication with the shock absorber 125, such that rotational movement of the mast pulley 135 may result with linear, translational movement to one end of the shock absorber 125.

Finally, FIG. 1 shows that the UAV recovery system 100 may comprise a shock absorber 125. The shock absorber 125 may be a component or device that provides tensioning and damping to the mast cable 130 during rotation of the mast pulley 135 and mast 105. Specifically, the shock absorber 125 may regulate tension to the mast cable 130 by pulling the mast cable 130 in response to a positive rotation of the mast 105, and thus, biasing or urging the mast 105 to perform a negative rotation back into its neutral position (i.e., the original starting position of the mast 105 at rest). The shock absorber 125 may also permit the mast 105 to undergo a positive rotation not to exceed more than a controlled-tensioned position (i.e., the maximum degree of positive rotation of the mast 105). Furthermore, the shock absorber 125 may provide damping by absorbing or dissipating any mechanical shocks or by reducing the response caused by the rotation of the mast 105. In some embodiments, damping may be provided for both compression and rebound strokes. In other embodiments, damping may be provided for only rebound strokes. Additional details about the shock absorber 125 are discussed further below in FIG. 3.

FIG. 2 is an illustration of a perspective view of another embodiment of the UAV recovery system and shows the UAV recovery system with a net. As shown in FIG. 2, another embodiment of the UAV recovery system 200 may comprise: a mast 105, upper boom 110, lower boom 115, cable and pulley arrangement 220, shock absorber 125, mast cable 130, and base 140. Unlike the embodiment shown in FIG. 1, another embodiment of the cable and pulley arrangement 220 may comprise: a net 170, cable 265, and support cables 171a, 171b, 171c, 172a, 172b, 172c.

Similar to the embodiment shown in FIG. 1, the first upper boom pulley 145 and second upper boom pulley 150 may be coupled near or at an associated end of the upper boom 110. The first lower boom pulley 155 and second lower boom pulley 160 may likewise be coupled near or at an associated end of the lower boom 115. The cable 265, which is preferably a flexible and elastic cord, may extend around the first upper boom pulley 145, second upper boom pulley 150, first lower boom pulley 155, and second lower boom pulley 160. The net 170 may be coupled or attached to the opposing ends of the cable 265 or portions thereof and may extend vertically from the upper boom 110 to the lower boom 115, as shown in FIG. 2. Thus, the net 170 may be disposed between the upper boom 110 and lower boom 115 and near the distal ends of the upper boom 110 and lower boom 115.

FIG. 2 also shows that the UAV recovery system 200 may comprise support cables 171a, 171b, 171c, 172a, 172b, 172c. The support cables 171a, 171b, 171c, 172a, 172b, 172c may be coupled between an end of the cable 265 (or a portion thereof) and the net 170 and may culminate at either end of the net 170. The support cables 171a, 171b, 171c, 172a, 172b, 172c may also stretch, widen, or expand the net 170 by coupling between the cable 265 and a corner end of the net 170. In particular, in the embodiment shown in FIG. 2, support cable 171a may be coupled between upper end of cable 265 and the upper left corner of the net 170; support cable 171b may be coupled between upper end of cable 265 and the upper middle portion of the net 170; and support cable 171c may be coupled between upper end of cable 265 and the upper right corner of the net 170. Additionally, support cable 172a may be coupled between lower end of cable 265 and the lower left corner of the net 170; support cable 172b may be coupled between lower end of cable 265 and the lower middle portion of the net 170; and support cable 172c may be coupled between lower end of cable 265 and the lower right corner of the net 170. In this manner, the net 170 may be stretched and expanded for retrieval of the UAV.

FIG. 3 is an illustration of a perspective view of one embodiment of a shock absorber and base for the UAV recovery system. As shown in FIG. 3, the lower end of the mast 105 may be coupled to the mast pulley 135, and the mast pulley 135 may be rotatably coupled to a swivel 137. The swivel 137 may also be coupled to the base 140. In this manner, the mast 105 may be adapted to rotate about a vertical axis with respect to the base 140. FIG. 3 also shows that the mast cable 130 may be physically coupled between the shock absorber 125 and the mast pulley 135.

FIG. 3 also shows that the shock absorber 125 may be coupled to the base 140 via mounts, 163, 164. As recited above, the shock absorber 125 may absorb or dissipate a mechanical shock or reduce the response of cable tensioning of the mast cable 130 caused by the rotation of the mast 105. The shock absorber 125 may also regulate tensioning of the mast cable 130. An embodiment of the shock absorber 125 may comprise: a damper 145 (shown in FIG. 4), end plate 151, mast cable interface 156, shafts 161a, 161b, 161c, 161d, mounts, 163, 164, and a coil spring 166. The damper 145 may be configured to dissipate kinetic energy. The shock absorber 125 may be in physical communication with the mast cable 130 via the mast cable interface 156, which preferably functions as an intermediary connection point. The mast cable interface 156 may be coupled between the mast cable 130 and first shaft ends of the shafts 161a, 161b, 161c, 161d. The second shaft ends of the shafts 161a, 161b, 161c, 161d may be coupled to the end plate 151. In this manner, the end plate 151 may be in physical communication with the mast cable 130. Thus, rotational movement of the mast pulley 135 may translate into linear movement of the mast cable 130 and end plate 151. Additional details of the inner workings of the shock absorber 125 are discussed below in FIG. 4.

Figure 4:
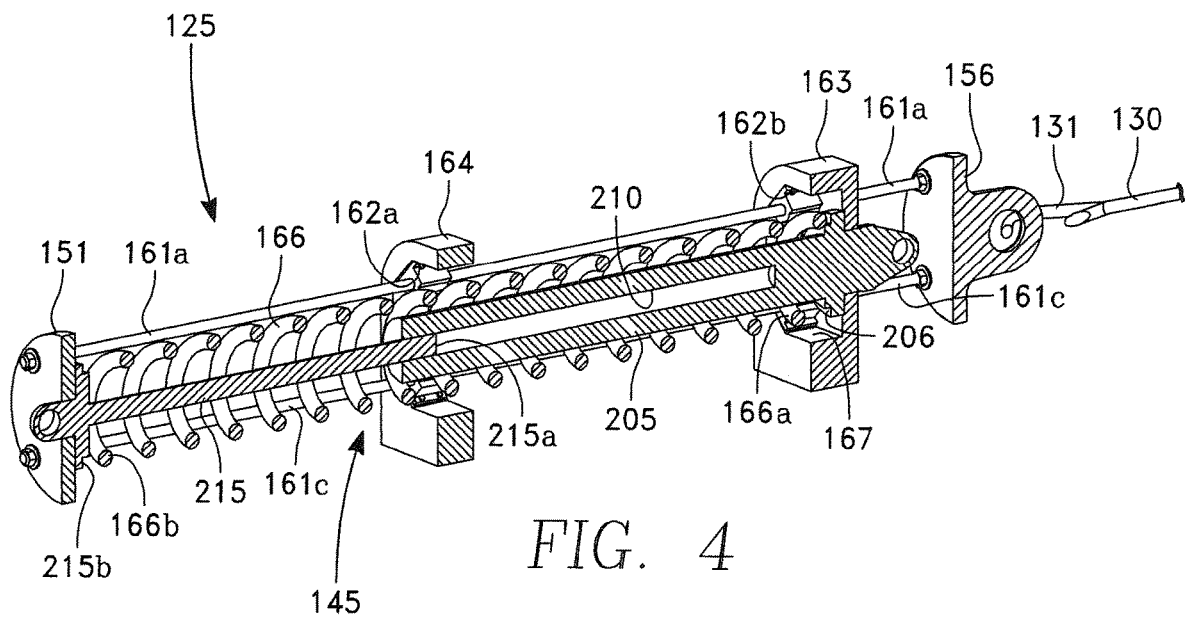
FIG. 4 is a cross-section view of the shock absorber, showing cut plane 4-4 (section 4-4 is depicted in FIG. 3), according to some embodiments of the present disclosure.

FIG. 4 is a cross-section view of the shock absorber, showing cut plane 4-4 (section 4-4 is depicted in FIG. 3), according to some embodiments of the present disclosure. As shown in FIG. 4, one embodiment of the shock absorber 125 may comprise: a damper 145, end plate 151, mast cable interface 156, shafts 161a, 161b, 161c, 161d, linear bearings 162a, 162b, mounts, 163, 164, and a coil spring 166. The damper 145 may be configured to dissipate kinetic energy and may comprise: a housing 205 with a fluid cavity 210 and a rod 215. The rod 215 may be movably disposed within the cavity 210 of the housing 205 and may move relative to the housing 205 along a longitudinal axis. In particular, the first rod end 215a may be disposed within the fluid cavity 210 of the housing 205, and the second rod end 215b may be coupled to the end plate 151. Thus, longitudinal movement of the end plate 151 may result with longitudinal movement of the rod 115 within the cavity 210 of the housing 205. A valve assembly 1100 (shown in FIG. 11) may be located at the first rod end 215a and disposed within the fluid cavity 210 for regulating the flow of fluid between opposing inner reservoirs within the shock absorber 125. Additional details of the valve assembly 1100 are discussed further below in FIG. 11.

FIG. 4 also shows that the shock absorber 125 may also comprise: a mast cable interface 156, which is an intermediary connection point between the mast cable 130 and the shafts 161a, 161b, 161c, 161d. In particular, the mast cable interface 156 may be coupled to the second cable end 131 of the mast cable 130, and the shafts 161a, 161b, 161c, 161d may be coupled between the mast cable interface 156 and the end plate 151. In this manner, the end plate 151 may be in physical communication with the mast cable 130, such that rotational movement of the mast pulley 135 may result with longitudinal movement of the end plate 151. The shafts 161a, 161b, 161c, 161d may also be used to distribute the energy load in a manner to prevent or minimize highly localized stress points in the shock absorber 125.

FIG. 4 also shows that the shock absorber 125 may comprise a coil spring 166. The coil spring 166 may be a mechanical component typically used for biasing, storing and releasing energy, absorbing shock, and/or maintaining a force between contacting surfaces. In an embodiment, the coil spring 166 may have a first spring end 166a held by a spring seat 206 of the housing 205, whereas the second spring end 166b of the coil spring 166 may be engaged with the end plate 151. Additionally, the spring seat 206 of the housing 205 may be engaged and/or disposed within a receptacle 167 of the mount 163. In this manner, the coil spring 166 may be used for biasing the end plate 151 away from both the housing 205 and mount 163 along a longitudinal axis. Furthermore, multiple coil springs may be used. For example, in one embodiment, two coil springs may be used in series, each of which may have a spring rate of about 500 lbr/in. Finally, FIG. 4 shows that the coil spring 166 may be disposed about an outer periphery of the housing 205 of the damper 145.

In operation, upon recovery of the UAV, the UAV may contact the cable 165 or net 170, causing the mast 105 and mast pulley 135 to rotate in a positive direction. This rotation may wind the mast cable 130 around the mast pulley 135, thereby pulling the mast cable 130 and mast cable interface 156 towards the mast 105. As a result, the shock absorber 125 may perform a compression stroke, which may compress the coil spring 166 and create stored energy within the coil spring 166.

Conversely, upon release of biasing force from the stored energy in the coil spring 166, the shock absorber 125 may expand, causing the shock absorber 125 to perform a rebound stroke. In this manner, the coil spring 166 of the shock absorber 125 may bias the mast cable 130 and mast cable interface 156 away from the mast 105, causing the mast 105 and mast pulley 135 to rotate in the negative direction and return to their neutral position.

More particularly, during the compression stroke, the mast 105 and mast pulley 135 may rotate upon recovery of the UAV. This may cause pulling or retraction of the mast cable 130, which may be coupled to the mast pulley 135. As a result, the mast cable interface 156 may move towards the mast 105 and mast pulley 135, transforming rotational movement of the mast 105 into translational movement of the mast cable interface 156. This may result with linear movement of the end plate 151 due to the physical connections of the shafts 161a, 161b, 161c, 161d and the mast cable interface 156. In response to this linear movement of the end plate 151, the shock absorber 125 may perform a compression stroke, which may compress the coil spring 166 and thus store energy.

On the other hand, when the shock absorber 125 is in rebound, the stored energy within the coil spring 166 is preferably released. Here, the coil spring 166 may bias the end plate 151 away from the housing 205, and thus, expand the coil spring 166, creating linear movement of the end plate 151 and the mast cable interface 156 via the shafts 161a, 161b, 161c, 161d. As a result, the mast cable interface 156 may move away from the mast 105 and mast pulley 135, thereby pulling the mast cable 130 and rotating the mast pulley 135 and mast 105. In this manner, linear movement of the shock absorber 125 may translate into rotational movement of the mast 105 during rebound.

Importantly, some embodiments of the UAV recovery system 100 may lack damping during the compression stroke. In those embodiments, the compression stroke may reach a complete stop between 0.43 to 0.51 seconds, depending on the weight of the UAV. In response, the UAV may experience a maximum reaction load of approximately 8,400 pounds. The UAV may also undergo an acceleration between 11.6 to 14.9 G's during compression.

On the other hand, during rebound, those embodiments of the UAV recovery system 100 may experience damping in order to slowly rotate and return the mast 105 back to its original, neutral position. In these embodiments, the rebound stroke may reach a complete stop between 1.5 to 2.0 seconds, depending on the weight of the UAV. In response, the UAV may experience an acceleration between 10.7 to 14.9 G's and may travel between 18 to 22 mph during rebound, depending on the weight of the UAV.

Notably, the UAV recovery system 100 may provide support to varying sizes of UAVs, given that the inertia mass of the UAV is very responsive to acceleration force inputs. The tables below illustrate the force characteristics for two UAVs weighing 28.9 lbs and 48.5 lbs, respectively.

In generating the tables below, formulas relating to energy methods were used. Specifically, the energy of a UAV may be calculated based on required kinetic energy needed to dissipate. Additionally, the inertial energy of the mast 105 is taken into account, as well as the geometric conditions of the mast pulley 135 and shock absorber 125. For example, in one embodiment, the diameter of the mast pulley 135 may be 21.6 inches. Using the force generated by the coil spring 166 opposing the direction of rotation of the mast 105 and the dampening characteristics of the shock absorber 125, the rotational displacement of the mast 105, velocity, and acceleration can be determined. Preferably, the maximum rotation of the mast 105 may also be determined when all the energy is dissipated. The dampening by the shock absorber 125 can be varied to provide the results shown in the following tables:

For Table 1, this embodiment of the UAV recovery system preferably provides no damping.

TABLE 1

| | | | | No Damping | | | |
|---|---|---|---|---|---|---|---|
| UAV Weight (lbs) | Time to Stop UAV (s) | Reaction Max Force (lbs) | Max Transverse Force on UAV (lbs) | G's transverse | Max Longitudinal Force on UAV (lbs) | G's Longitudinal | Initial Force on UAV (lbs) |
| 28.9 | 0.33 | 6415 | 429.83 | 14.87 | 380.15 | 13.15 | 0 |
| 48.5 | 0.41 | 8364 | 560.5 | 11.56 | 717.1 | 14.79 | 0 |

For Table 2, this embodiment of the UAV recovery system 100, 200 preferably utilizes 1000 N s/m damping and may have an adjustable mast cam 440 (shown in FIG. 5) having three holes, each having a 0.096 inch diameter. The shock absorber 125 here may achieve a maximum valving force of 1631 pounds.

TABLE 2

| | | | | 1000 N-s/m Damping | | | |
|---|---|---|---|---|---|---|---|
| UAV Weight (lbs) | Time to Stop UAV (s) | Reaction Max Force (lbs) | Max Transverse Force on UAV (lbs) | G's transverse | Max Longitudinal Force on UAV (lbs) | G's Longitudinal | Initial Force on UAV (lbs) |
| 28.9 | 0.32 | 6148 | 411.95 | 14.25 | 380.15 | 13.15 | 23.2 |
| 48.5 | 0.4 | 8077 | 541.2 | 11.16 | 717.1 | 14.79 | 24.6 |

Finally, for Table 3 below, the UAV recovery system 100, 200 preferably utilizes 5000 N s/m damping and may have an adjustable mast cam 440 having three holes, each having a 0.065 inch diameter. The shock absorber 125 here may achieve a maximum valving force of 1861 pounds.

| | | | | 5000 N-s/m Damping | | | |
|---|---|---|---|---|---|---|---|
| UAV Weight (lbs) | Time to Stop UAV (s) | Reaction Max Force (lbs) | Max Transverse Force on UAV (lbs) | G's transverse | Max Longitudinal Force on UAV (lbs) | G's Longitudinal | Initial Force on UAV (lbs) |
| 28.9 | 0.3 | 5252 | 351.97 | 12.18 | 380.15 | 13.15 | 115.9 |
| 48.5 | 0.38 | 7084 | 474.65 | 9.79 | 717.1 | 14.79 | 122.9 |

Based on the results shown in in the Tables above, adding dampening in the shock absorber 125 may causes the transverse Gs to drop (i.e., Gs that are more detrimental to the UAV). Dampening also results with less rotation to the mast 105 before halting or stopping, and less reaction force.

Importantly, the longitudinal Gs generally do not change due to the initial impact of the UAV, causing a peak force that is independent of the level of dampening. In particular, the dampening outlined above is preferably dampening of velocity where if the mast 105 is moving slowly, there is little dampening, which is the case during initial impact. Notably, when there is an increase in dampening, the fluid within the shock absorber 125 may tend to heat more. Thus, an external reservoir with heat fins is contemplated to ensure that the fluid does overheat to appreciably affect its viscosity and thus lower the dampening effects.

Figure 5:
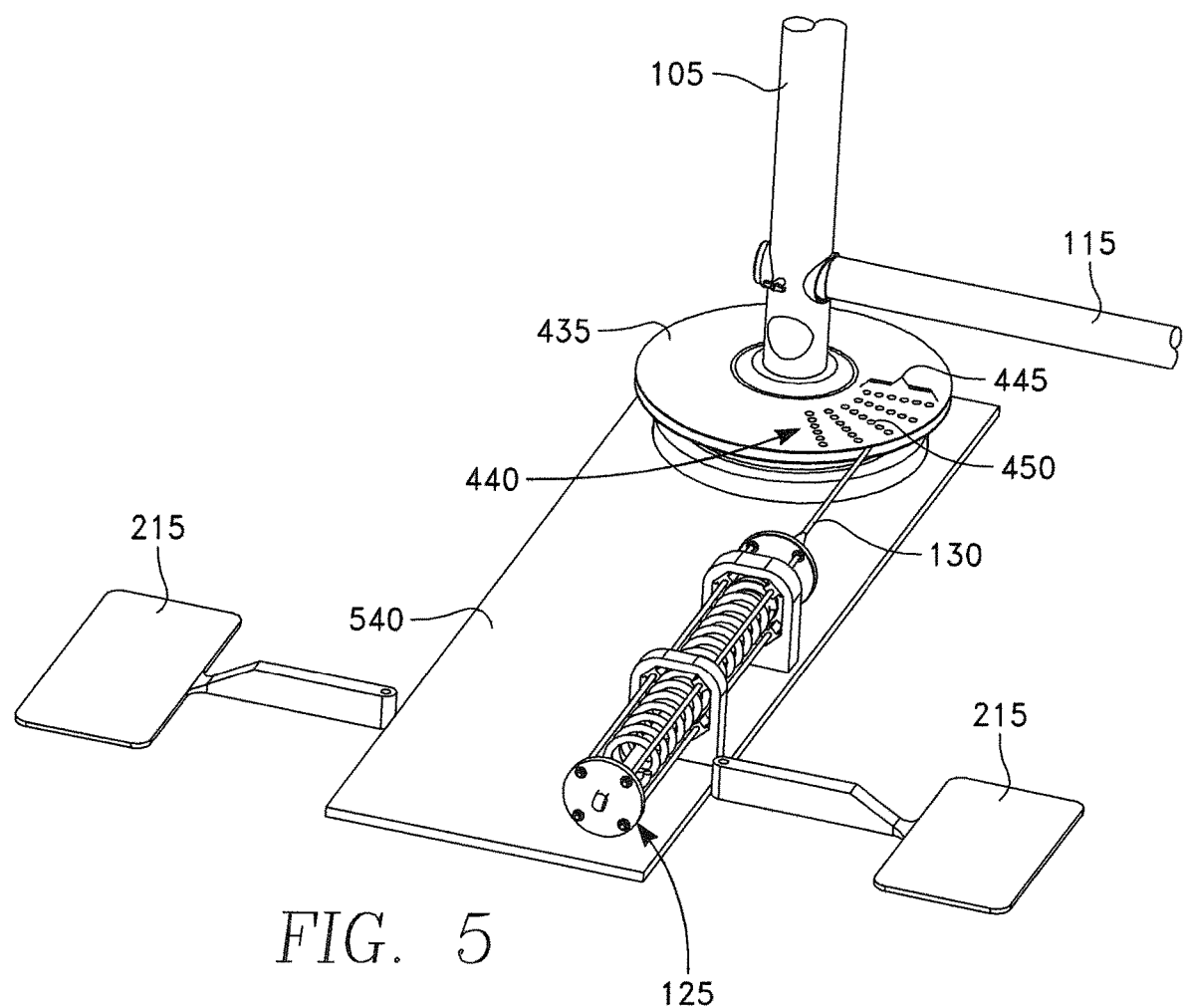
FIG. 5 is an illustration of a perspective view of another embodiment of the base and mast pulley and shows the base with wheel chocks.

FIG. 5 is an illustration of a perspective view of another embodiment of the base and mast pulley and shows the base with wheel chocks. As shown in FIG. 5, another embodiment of the base 540 may comprise wheel chocks 215, which may be wedges of sturdy material extending laterally from the base 540 and adapted to be placed beneath or closely against wheels of a vehicle 600 (shown in FIGS. 6A and 6B). The wheel chocks 215 may allow the UAV recovery system 300 to be secured to the vehicle 600 and may help restrain movement of the UAV recovery system 300 when retrieving the UAV. Because the wheel chocks 215 generally include structural stability and resistance to horizontal force, the bottom surface of the base 540 and wheel chocks 215 may be coated with material having a high coefficient of friction (e.g., rubber) to enhance grip with the ground surface. Thus, the wheel chocks 215 may be substantially affixed to the ground to prevent undesired horizontal movement. Additional details about how the wheel chocks 215 are used to secure the UAV recovery system 300 is further described below and shown in FIGS. 6A and 6B.

FIG. 5 also shows another embodiment of the mast pulley 435 having an adjustable mast cam 440 for the mast cable 130. As shown in FIG. 5, one embodiment of the adjustable mast cam 440 of the mast pulley 435 may comprise multiple groups of holes 445 and multiple adjustable pins 450. FIG. 5 shows that the holes 445 may be arranged radially away from the center of the mast pulley 435, which is preferably the fixed axis of rotation. Importantly, the adjustable pins 450 may be adapted to removeably engage with the holes 445, such that the positions of the radially adjustable pins 450 may project the mast cable 130 radially outwardly from the fixed axis of the rotation of the mast pulley 435. In this manner, the adjustable pins 450 may provide an arc of much greater radius relative to the axis of rotation of the mast pulley 435 to accommodate various torsional force created by the decelerating aircraft during recovery.

Figure 6B:
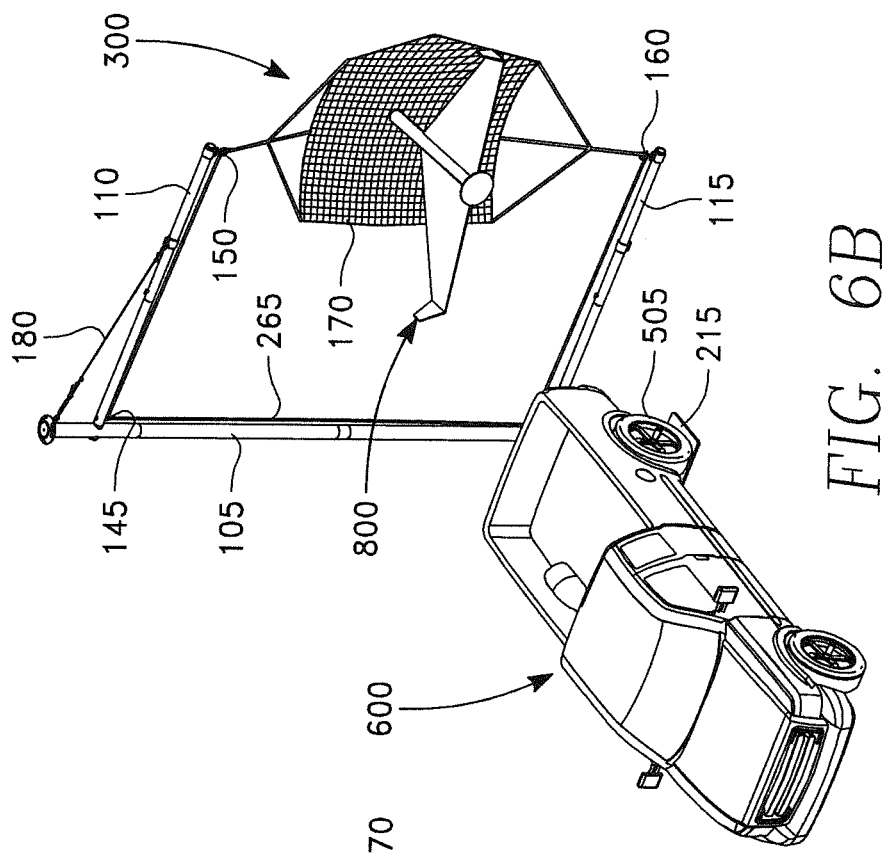
FIGS. 6A and 6B are illustrations of another embodiment of the UAV recovery system secured to a vehicle while recovering a UAV.
Figure 6A:
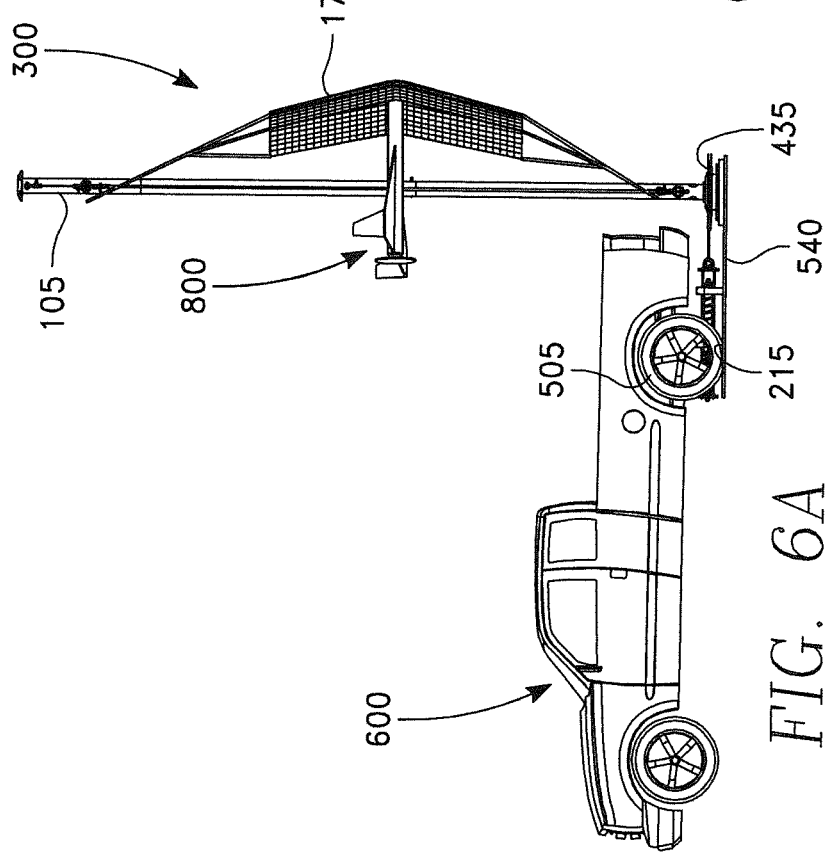

FIGS. 6A and 6B are illustrations of another embodiment of the UAV recovery system secured to a vehicle while recovering a UAV. In particular, FIGS. 6A and 6B are illustrations of a side elevational view and perspective view, respectively, of the UAV recovery system 300 with wheel chocks 215. As shown in FIGS. 6A and 6B, an embodiment of the UAV recovery system 300 may be secured by a vehicle 600 by positioning the wheels 505 of the vehicle 600 on the wheel chocks 215. In this manner, the vehicle 600 may restrain sudden horizontal movement of the UAV recovery system 300 during recovery of a UAV 800. In particular, when a UAV 800 contacts the net 170, the upper boom 110 and lower boom 115 may swivel and cause the mast 105 to rotate. This sudden rotation may produce sudden horizontal movement towards the mast 105, causing the mast 105 to tilt or possibly fall over. Because the wheel chocks 215 are secured beneath the wheels 505 of the vehicle 500, the wheel chocks 215 may help restrain movement of the UAV recovery system 300 and thus secure the UAV recovery system 300 during retrieval of the UAV 800. In an alternative implementation, the UAV recovery system 300 may also be secured to the vehicle 600 by placing the wheel chocks 215 against the wheels 505 of the vehicle 600.

Figure 7:
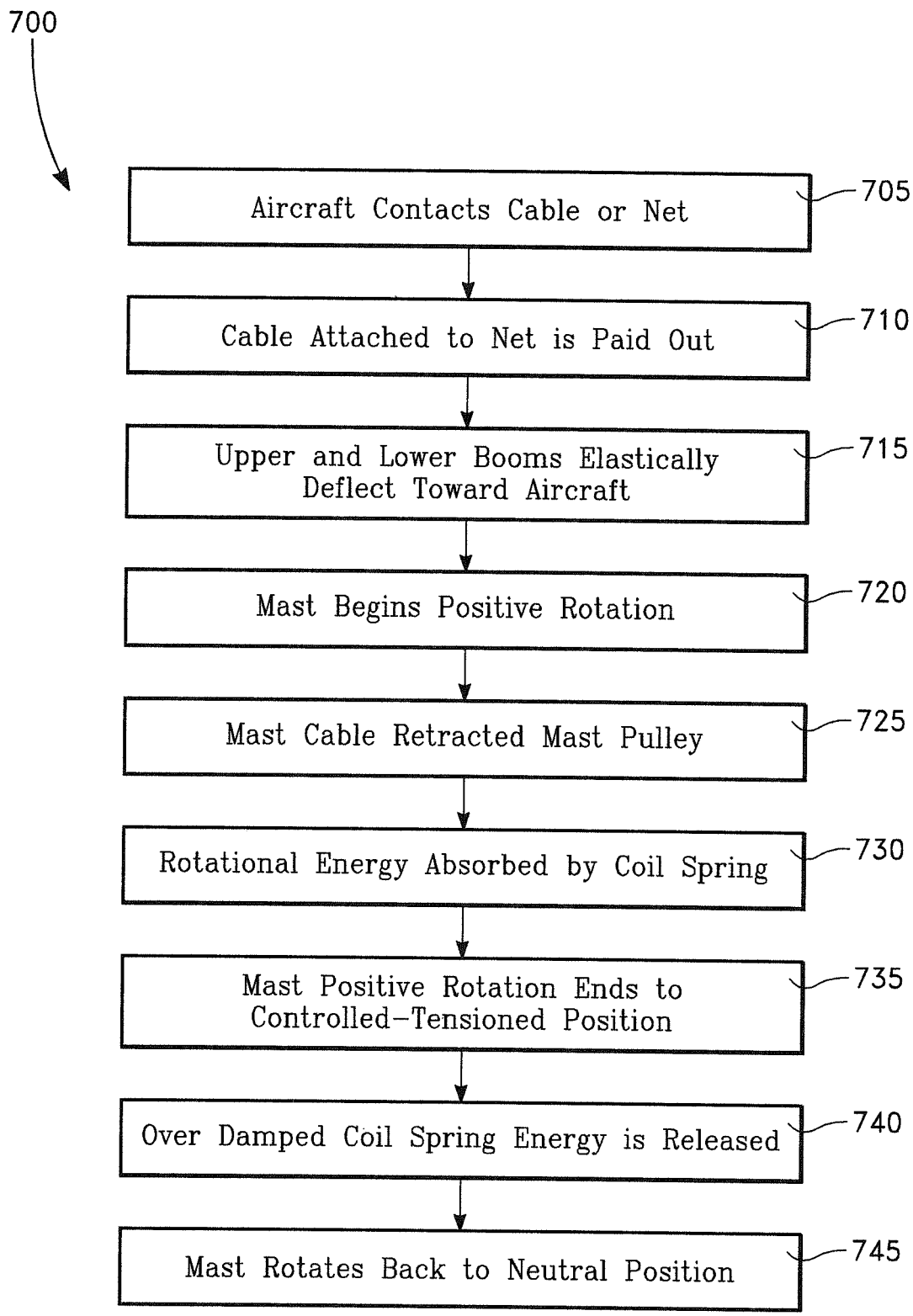
FIG. 7 is a flow diagram of the recovery sequence for a UAV using the UAV recovery system, according to some embodiments of the present disclosure.

FIG. 7 is a flow diagram of the recovery sequence for a UAV using the UAV recovery system, according to some embodiments of the present disclosure. As shown in FIG. 7, one embodiment of the recovery sequence 700 may comprise steps: 705, 710, 715, 720, 725, 730, 735, 740, and 745. Prior to step 705, some embodiments of the UAV recovery system 300 may comprise wheel chocks 215, which may be secured to a vehicle for support (see FIGS. 6A and 6B). In other embodiments, the UAV recovery system 100, 200 may be secured to other structures such as a ship vessel or may be freestanding, as shown in FIGS. 8A to 10C.

Turning to FIG. 7, the first step 705 of the recovery sequence 700 may be the UAV 800 contacting the cable 165 or net 170 of the UAV recovery system 200, 300. Here, the UAV 800, which is preferably in-flight, may be guided towards the net 170 and accelerating at a high speed (shown in FIGS. 8A to 8C). When the UAV 800 contacts the cable 165 or net 170 in step 705, the cable 265 of the cable and pulley arrangement 220 may be paid out (step 710). This may cause the upper boom 110 and lower boom 115 to elastically deflect towards the UAV 800, as shown in step 715 and FIGS. 9A and 9B. As a result, the UAV 800 may decelerate due to the tensioning of the cable 265 and the elastic deflection of the upper boom 110 and lower boom 115.

In embodiments where a cable 165 is used without a net 170, the UAV 800 may target a touchdown point (TDP) 165a (shown in FIG. 1) during recovery. The TDP 165a is preferably a target area located near or at the center of the cable 165 and mast 105, and preferably, not near the upper boom 110. Contacting and securing the UAV to the TDP 165a may also allow the UAV 800 to travel upwards in an arc like manner to prevent the UAV 800 from looping onto itself and possibly colliding with the upper boom 110. Centrifugal acceleration produced by the rotating mast 105 may also help prevent the UAV 800 from colliding with the upper boom 110.

Figure 9A:
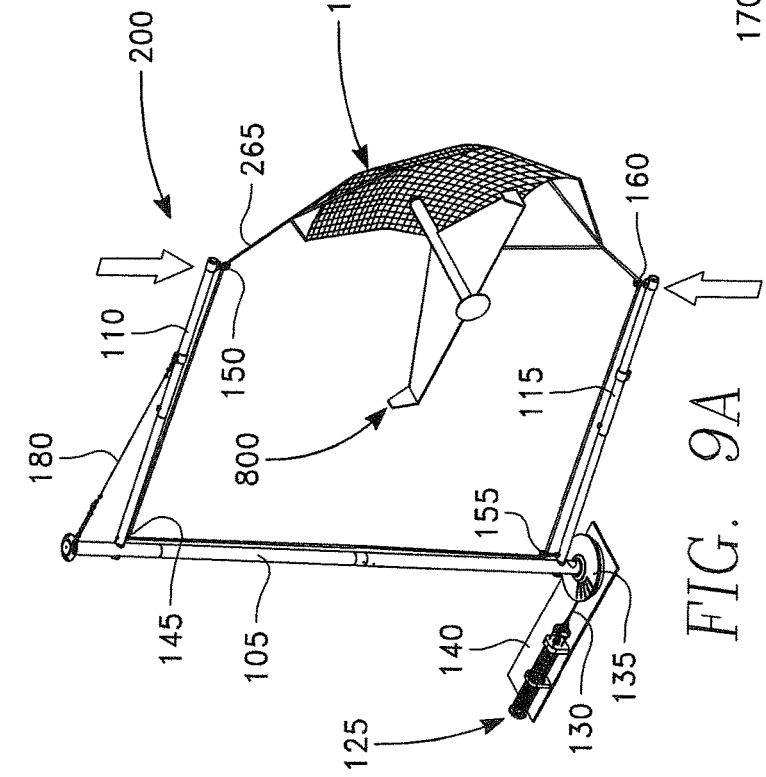
FIGS. 9A to 9C are illustrations of a perspective, front elevational, and top plan views of one embodiment of the UAV recovery system and shows the UAV contacting the net of the UAV recovery system.
Figure 9B:
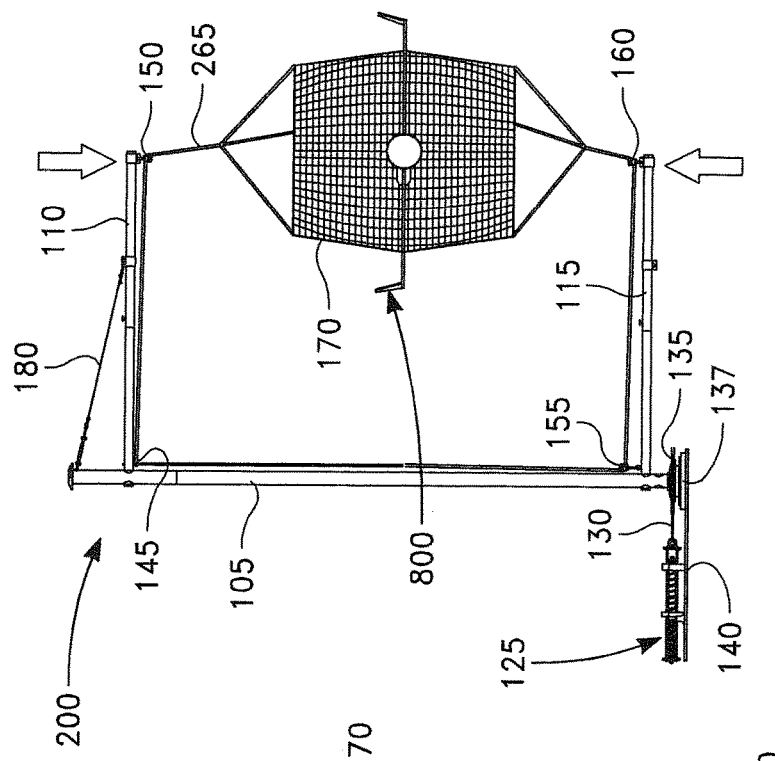
Figure 9C:
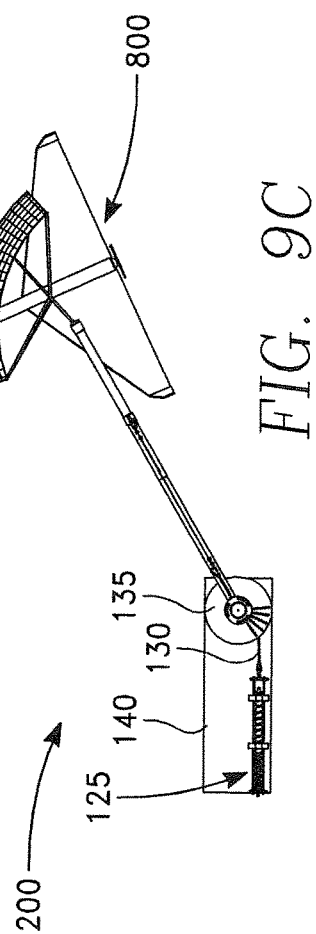

The recovery sequence 700 may then proceed to step 720, which may be rotating the mast 105 in a positive direction, as shown in FIGS. 9A to 9C. As the mast 105 rotates, the mast pulley 135 rotates and thus may retract the mast cable 130 (step 725). In some embodiments where the mast pulley 135 utilizes an adjustable mast cam 440, the retraction of the mast cable 130 may also be affected by the degree of rotational force. For example, in one embodiment where the adjustable pins 450 are engage with holes 445 located radially farthest from the center of the mast pulley 135, the adjustable pins 450 may provide an arc and greater radius relative to the axis of rotation of the mast pulley 435. As a result, the initial rotational force applied towards the mast 105 (due to contact by the UAV 800) is generally much greater. On the other hand, if the adjustable pins 450 are engaged with the holes 445 located radially closer to the center of the mast pulley 135, the adjustable pins 450 may provide a shorter arc and radius relative to the axis of rotation of the mast pulley 435. As a result, less initial rotational force is needed towards the mast 105.

FIG. 7 also shows the next step 730, which may be absorbing the rotational energy by the coil spring 166. Here, as the mast 105 and mast pulley 135 rotate, the mast cable 130, which is preferably coupled to the mast pulley 135, may also be retracted and pulled. As a result, the mast cable interface 156 may also be pulled towards the mast 105 and mast pulley 135, causing the shock absorber 125 to perform a compression stroke. Thus, rotational movement of the mast 105 may transform into translational movement of the mast cable interface 156, causing linear movement of the end plate 151 due to the shafts 161a, 161b, 161c, 161d and mast cable interface 156. In response to the linear movement of the end plate 151, the coil spring 166 may bias the end plate 151 away from the housing 205 and cause rotational energy created by the mast 105 to be dampened and absorbed by the coil spring 166.

Finally, FIG. 7 shows the last few steps of the recovery sequence 700. In step 735, after the UAV 800 contacts the net 170 and the mast 105 rotates in a positive rotation, the rotation of the mast 105 may stop or halt at a controlled-tensioned position, which may be the maximum degree of rotation of the mast 105. The controlled-tensioned position may depend on various factors such as relative length of the coil spring 166, length of the mast cable 130, diameter of the mast pulley 135, and the like. In some embodiments, the controlled-tensioned position may halt rotation of the mast 105 at an angle of about 90° with respect to the base 140 (shown in FIGS. 10A to 10C). In other embodiments, the controlled-tensioned position may be higher or lower than 90°. Upon reaching the controlled-tensioned position, the coil spring 166 may be fully compressed and any over-damped stored energy in the coil spring 166 may be released (step 740). As a result, the shock absorber 125 may perform a rebound stroke, causing the mast 105 to perform a negative rotation and return back to its original, neutral position (step 745).

FIGS. 8A to 8C are illustrations of perspective, front elevational, and top plan views of one embodiment of the UAV recovery system and depicts the mast in a neutral position right before contact with the UAV. Specifically, FIGS. 8A to 8C show the UAV recovery system 200 in a neutral position, in which the mast 105 is not rotated and the coil spring 166 is de-energized and exerting no biasing force. Preferably, the net 170 is disposed between the upper boom 110 and lower boom 115 and may be extended somewhat vertically. The mast cable 130 may also have some cable tension. Preferably, the UAV recovery system 200 is in the neutral position while the UAV 800 is flying towards the direction of the net 170, as shown in FIGS. 8A to 8C.

FIGS. 9A to 9C are illustrations of a perspective, front elevational, and top plan views of one embodiment of the UAV recovery system and shows the UAV contacting the net of the UAV recovery system. Specifically, FIGS. 9A to 9C show the mast 105 of the UAV recovery system 200 during a positive rotation when the UAV 800 is in contact with the net 170. At this time, the cable 265 may be paid out, and the upper boom 110 and lower boom 115 may elastically deflect towards the UAV 800. As a result, the UAV 800 may begin to decelerate due to the payout of the cable 265 and the elastic deflection of the upper boom 110 and lower boom 115.

Importantly, the rotation of the mast 105 may cause pulling or retracting of the mast cable 130 from the shock absorber 125. This may cause cable tensioning of the mast cable 130 and energizing of the coil spring 166. The energized coil spring 166 may then create biasing to the mast cable 130, causing the mast 105 to later rotate back to its neutral position.

FIGS. 10A to 10C are illustrations of a perspective, front elevational, and top plan views of one embodiment of the UAV recovery system and shows the mast in a controlled-tensioned position after contact with the UAV. Specifically, FIGS. 10A to 10C show the UAV recovery system 200 in a controlled-tensioned position, in which the mast 105 is fully rotated and the coil spring 166 is energized to exert some biasing force. Although FIGS. 10A to 10C show the net 170 being somewhat disposed between the upper boom 110 and lower boom 115, the net 170 may be pulled away from the upper boom 110 and lower boom 115 and in the direction of the flight path of the UAV 800. The upper boom 110 and lower boom 115 may also be rotated about the fixed axis of rotation of the mast pulley 135, and the rotation may be at an angle (preferably between 90° and 270° degrees). While in the controlled-tensioned position, the UAV recovery system 200 may also pull or retract the mast cable 130, resulting with some cable tension. Preferably, the UAV 800 is caught within the net 170 when the UAV recovery system 200 is in the controlled-tensioned position, as shown in FIGS. 10A to 10C.

Figure 11:
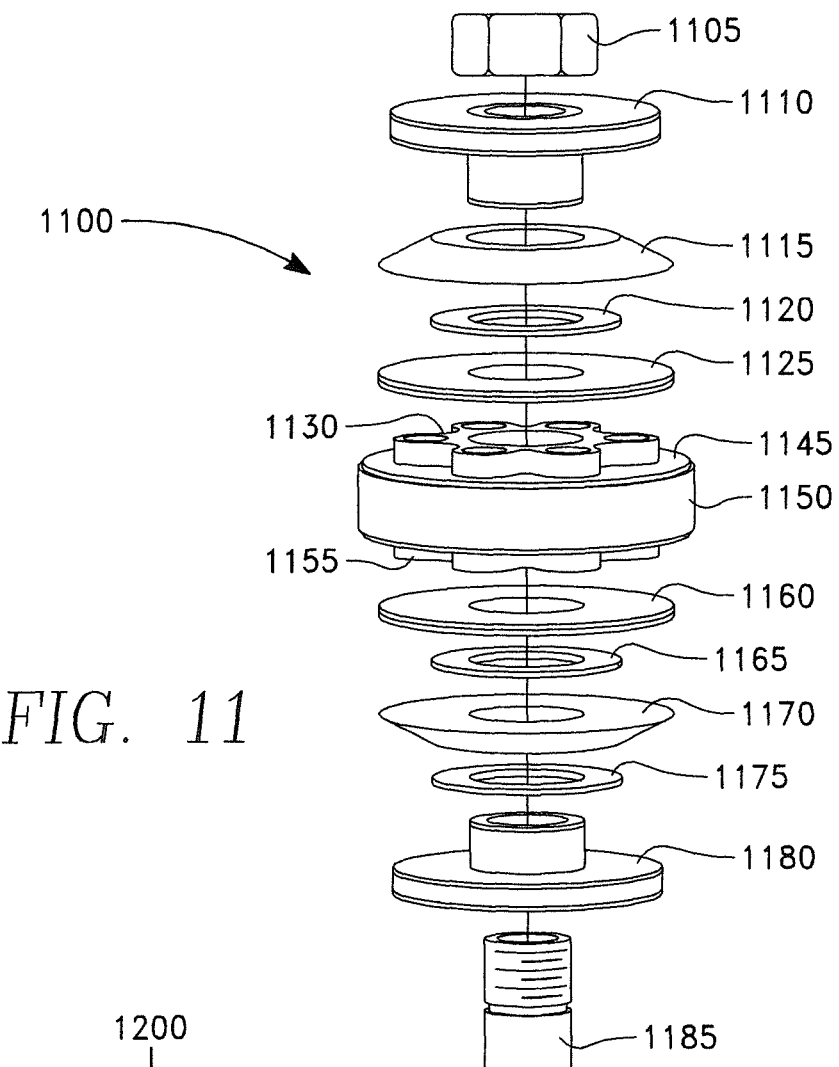
FIG. 11 is one embodiment of a valve assembly for the shock absorber, according to the present disclosure.

FIG. 11 is one embodiment of a valve assembly for the shock absorber, according to the present disclosure. The valve assembly 1100, which is preferably disposed within the shock absorber 125, may be configured to control the flow of fluid between the opposing inner reservoirs of the fluid cavity 210. Thus, depending on the size of the UAV 800, the valve assembly 1100 may be appropriately shimmed for compression and rebound strokes. In alternative embodiments, the UAV recovery system 100 may accommodate other sizes of UAVs 800 by simply replacing the coil spring 166 or mast pulley 135. Additionally, various configurations of the shims may handle a particular weight range of UAVs 800 but may be unable to recover other UAVs having weights outside that weight zone. In those circumstances, the sizes of the shims may be adjusted or modified.

As shown in FIG. 11, one embodiment of the valve assembly 1100 may comprise: a nut 1105, first adapter base plate 1110, gold valve 1145, piston ring 1150, spacing shim 1175, second adapter base plate 1180, and step 1185. Importantly, the valve assembly 1100 may also comprise rebound shims located adjacent to the rebound side 1130 of the piston ring 1150 and compression shims located adjacent to the compression side 1155 of the piston ring 1150. The rebound shims may include: a high-speed rebound shim 1115, rebound crossover shim 1120, and low-speed rebound shim 1125, whereas the compression shims may include: a low-speed compression shim 1160, compression crossover shim 1165, and high-speed compression shim 1170.

The UAV recovery system 100, 200, 300 may accommodate various UAV weights and sizes by replacing the rebound shims and compression shims with varying thicknesses. By adjusting the thicknesses of these shims, more or less fluid may travel through the reservoirs of the shock absorber 125 for increase or decrease damping. For example, in an exemplary embodiment, the compression stroke may be relatively soft by utilizing a set of low speed compression shims and high speed compression shims. Conversely, for the rebound stroke, a set of low speed rebound shims with a progressive set of shims may be used. In this manner, the rebound stroke may increase damping and recover the UAV 800 slowly to the neutral position to help prevent damage from the UAV 800.

In multiple embodiments, the shock absorber 125 may comprise shock fluid. The shock fluid may have a viscosity of 0.03182 $Ns/m^2$, and the viscosity of the shock fluid preferably does not change when heated. Additionally, in an exemplary embodiment, the valve body may be 2.5 inches in diameter.

Figure 12:
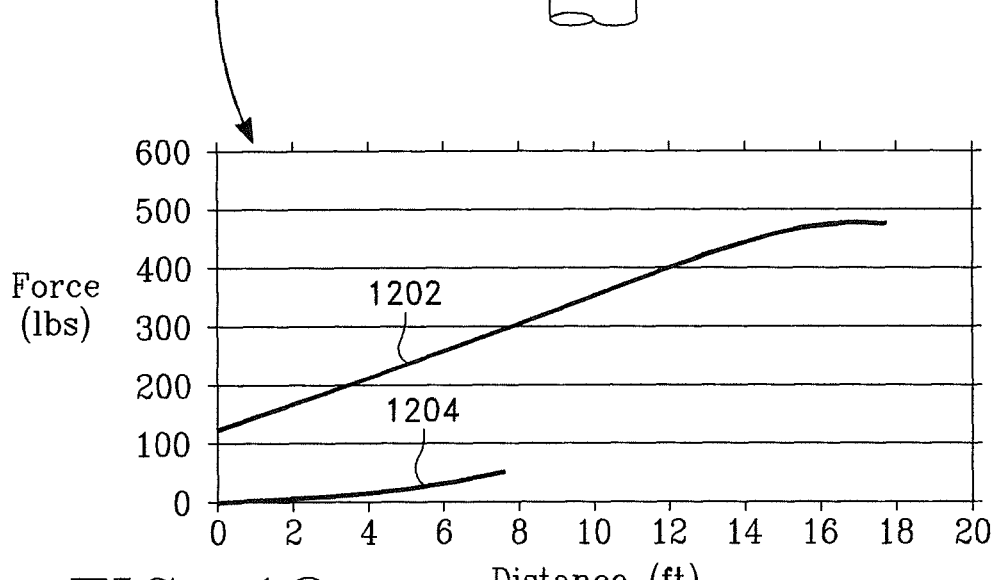
FIG. 12 is a graph depicting the relationship between force exerted by the UAV and distance during recovery.

FIG. 12 is a graph depicting the relationship between force exerted by the UAV and distance during recovery. Plot 1202 shows the relationship between the resulting force and distance by the coil spring 166, whereas plot 1204 shows the relationship between the resulting force and distance due to the cable 165, 265. In this embodiment, the UAV 800 may weigh approximately 50 lbs. As recited above, the cable 165, 265 used for UAV recovery system 100, 200, 300 may initially catch and decelerate the UAV 800. As the aircraft makes contact with the cable 165, 265, the cable 165, 265 decelerates the UAV 800 and may impart some force, causing the mast 105 to rotate slightly. As a result, the cable 165, 265 may provide an initial displacement, which may be approximately eight feet, as shown in FIG. 12.

Importantly, the shock absorber 125 may perform a compression stroke, causing the UAV 800 to impart force to the coil spring 166. FIG. 12 shows that the amount of force experienced by the coil spring 166 may increase as the recovery distance of the UAV 800 increases. Specifically, the UAV 800 may initially impart a force between 0 to 50 pounds onto the cable 165, 265, and then later impart a force between approximately 100 to 500 pounds onto the coil spring 166. As a result, the UAV 800 may experience a total recovery distance of approximately 18 feet.

Figure 13A:
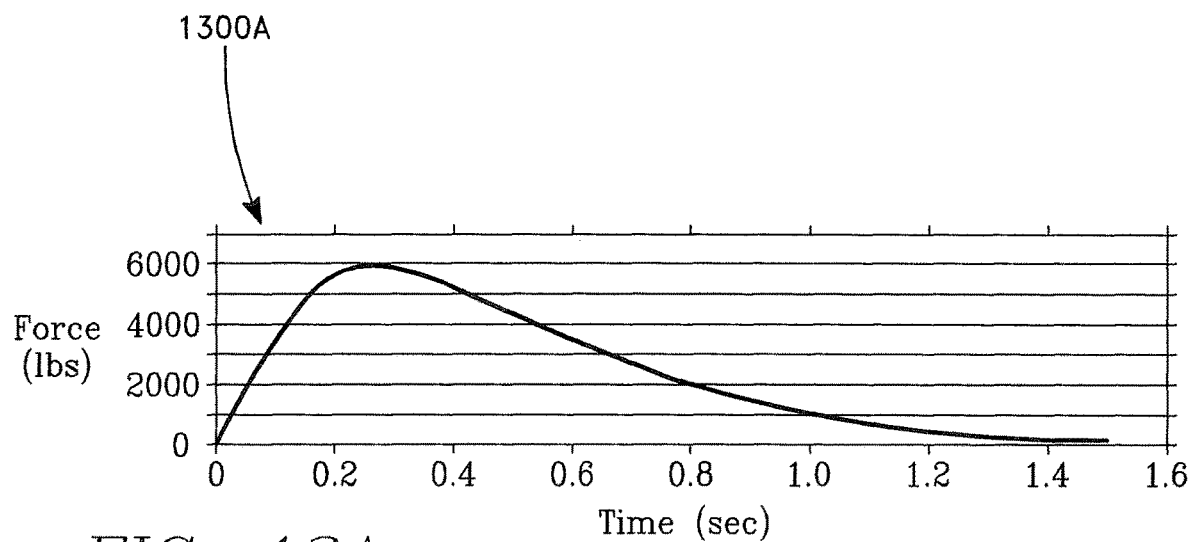
FIGS. 13A and 13B are graphs depicting the damping force characteristics of the UAV recovery system for a 48.5 pound UAV, according to some embodiments of the present disclosure.
Figure 13B:
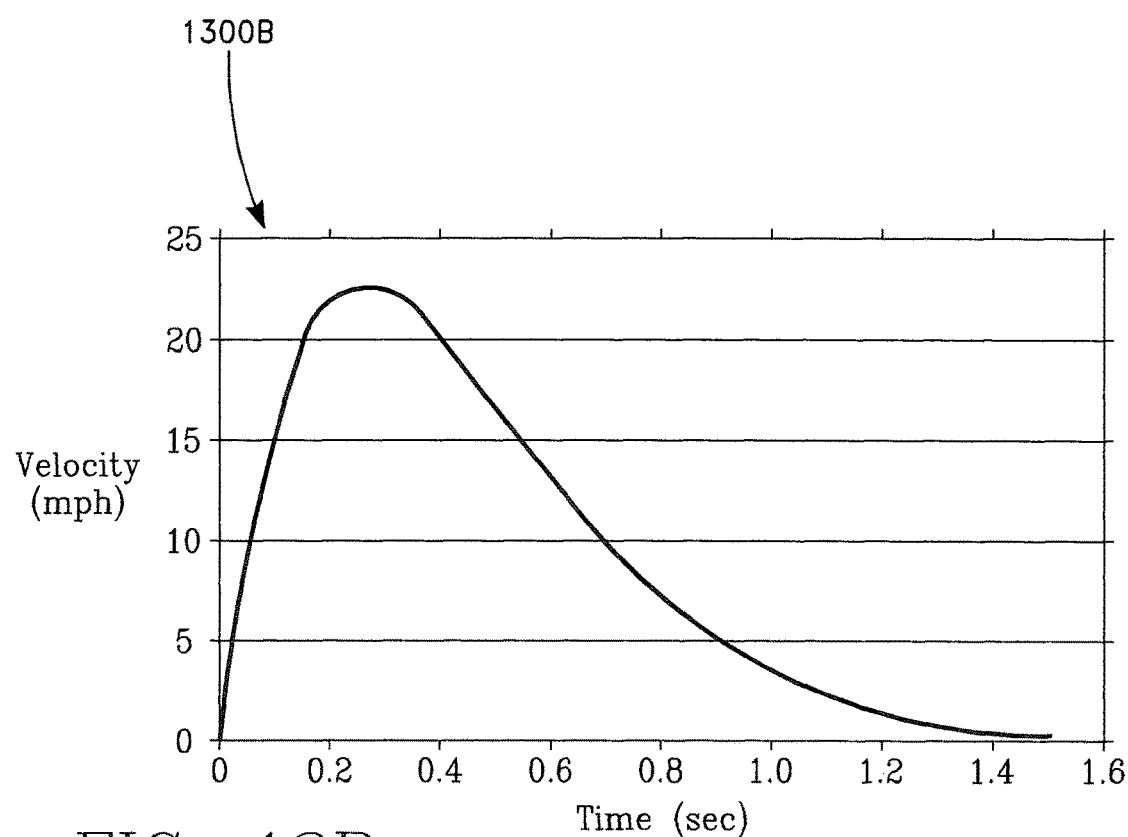

FIGS. 13A and 13B are graphs depicting the damping force characteristics of one embodiment of a UAV recovery system for a 48.5 pound UAV. Plot 1300a shows the relationship between force and time for the UAV 800, whereas plot 1300b shows the relationship between velocity and time for the UAV 800. Here, the UAV recovery system 100, 200, 300 may experience zero damping during the compression stroke with a critically damped coefficient of 40,000 $Nm/s^2$. Additionally, FIG. 13A shows that the maximum force that the UAV recovery system 100, 200, 300 may experience when recovering a 48.5 pound UAV 800 may be 5969 lbs. According to FIGS. 13A and 13B, the total time for the UAV recovery system 100, 200, 300 to recover the 48.5 pound UAV 800 may be approximately 1.51 seconds, and the maximum velocity that the 48.5 pound UAV 800 may experience is 22 mph.

Figure 14A:
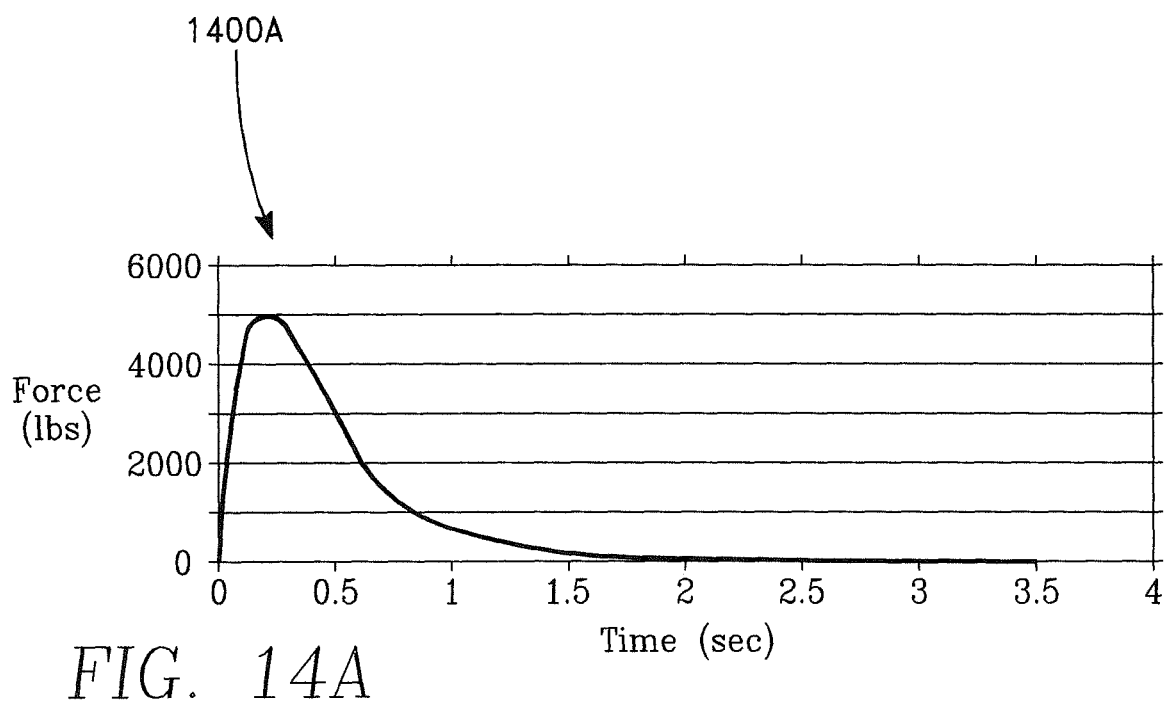
FIGS. 14A and 14B are graphs depicting the damping force characteristics of the UAV recovery system during for a 28.9 pound UAV, according to some embodiments of the present disclosure.
Figure 14B:
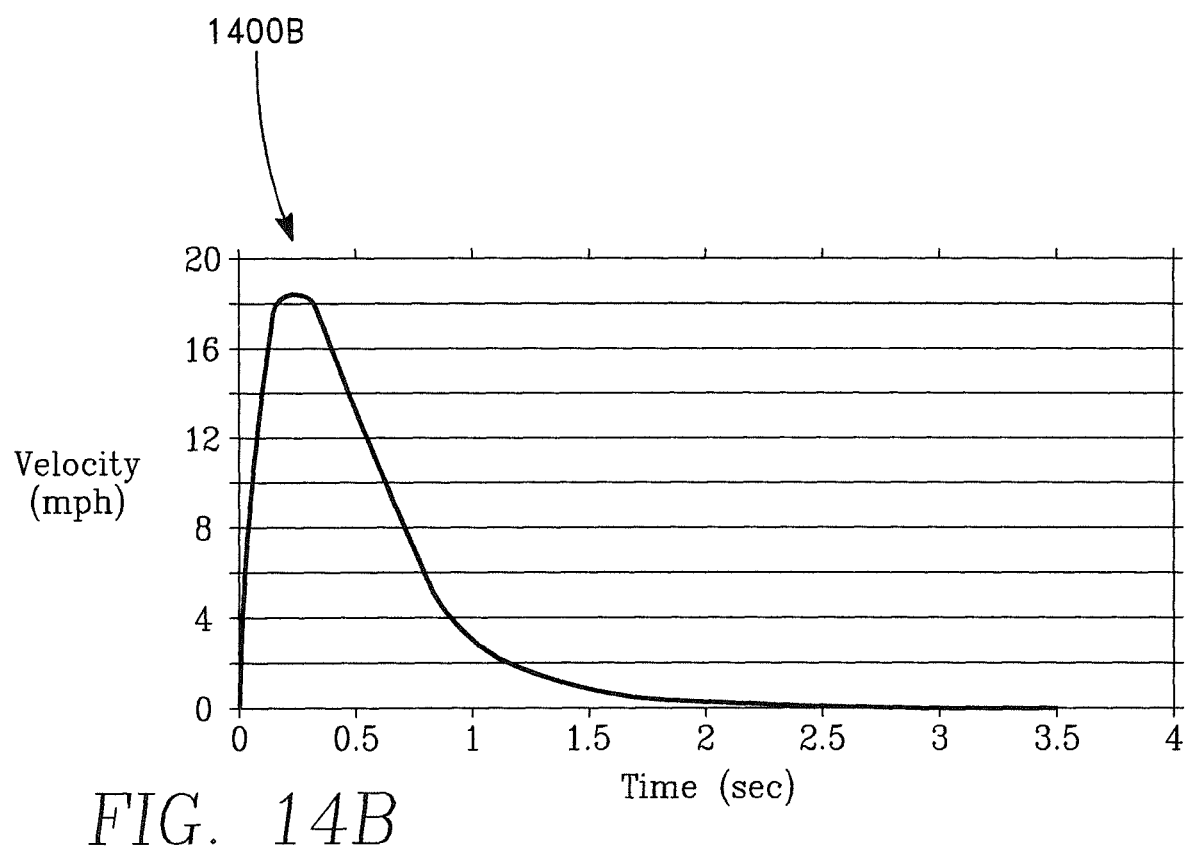

FIGS. 14A and 14B are graphs depicting the damping force characteristics of one embodiment of a UAV recovery system during for a 28.9 pound UAV. Plot 1400a shows the relationship between force and time for the UAV 800, whereas plot 1400b shows the relationship between velocity and time for the UAV 800. Here, the UAV recovery system 100, 200, 300 preferably experiences zero damping during the compression stroke with a critically damped coefficient of 40,000 $Nm/s^2$. The maximum force that the UAV recovery system 100, 200, 300 may experience when recovering the 28.9 pound UAV 800 may be 4937 lbs. According to FIGS. 14A and 14B, the total time for the UAV recovery system 100, 200, 300 to recover the 28.9 pound UAV 800 may be approximately 2 seconds, and the maximum velocity that the 28.9 pound UAV 800 may experience is 18.5 mph.

The foregoing description of the embodiments of the UAV recovery system has been presented for the purposes of illustration and description. While multiple embodiments of the UAV recovery system are disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Although embodiments of the UAV recovery system are described in considerable detail, including references to certain versions thereof, other versions are possible such as, for example, orienting and/or attaching components in different fashion. Therefore, the spirit and scope of the appended claims should not be limited to the description of versions included herein.

Except as stated immediately above, nothing which has been stated or illustrated is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. An unmanned aerial vehicle (UAV) recovery system, comprising:
    a mast coupled to a mast pulley having a swivel and adapted to rotate about a fixed axis of rotation;
    a base coupled to said swivel;
    upper and lower booms extending somewhat horizontally from said mast;
    a cable and pulley arrangement, comprising:
        first and second upper boom pulleys, each coupled near an associated end of said upper boom;
        first and second lower boom pulleys, each coupled near an associated end of said lower boom; and
        a cable forming a loop and extending around said first and second upper boom pulleys and said first and second lower boom pulleys;
    a shock absorber coupled to said base; and
    a mast cable having a first cable end coupled to said mast pulley and a second cable end coupled to said shock absorber.

2. The UAV recovery system according to claim 1, characterized in that said shock absorber comprises:
    a damper having a housing with a fluid cavity extending along a longitudinal axis and a rod adapted to move relative to said housing along said longitudinal axis, said rod having a first rod end disposed within said fluid cavity and a second rod end traversing from said housing along said longitudinal axis;
    an end plate coupled to said second rod end;
    first and second mounts for coupling said shock absorber to said base, said first mount having a receptacle configured to engage with said housing;
    a mast cable interface coupled to said second cable end of said mast cable;
    a plurality of shafts coupled between said mast cable interface and said end plate, such that said end plate is in physical communication with said mast cable; and
    a coil spring having a first spring end engaged with a spring seat of said housing and a second spring end engaged with said end plate for biasing said end plate away from said housing along said longitudinal axis, wherein said spring seat of said housing is engaged with said receptacle of said first mount, such that said coil spring is adapted to bias said end plate away from said first mount.

3. The UAV recovery system according to claim 1, further comprising:
    a net coupled to said cable and extending somewhat vertically from said upper boom to said lower boom.

4. The UAV recovery system according to claim 1, characterized in that said base further comprises two wheel chocks extending laterally from said base.

5. The UAV recovery system according to claim 1, characterized in that said mast pulley comprises an adjustable mast cam, comprising:
    one or more plurality of holes, each of said plurality of holes being arranged radially away from said fixed axis of rotation; and
    a plurality of adjustable pins adapted to engage with said one or more plurality of holes.

6. The UAV recovery system according to claim 1, characterized in that said upper boom and said lower boom are flexible.

7. The UAV recovery system according to claim 1, further comprising:
    a guy wire having a first wire end coupled to an upper end of said mast and a second wire end coupled to said upper boom.

8. A UAV recovery system, comprising:
    a mast coupled to a mast pulley having a swivel, said mast being vertically disposed and adapted to rotate about a fixed axis of rotation;
    a base coupled to said swivel;
    upper and lower booms extending somewhat horizontally from said vertically disposed mast;
    a cable and pulley arrangement, comprising:
        first and second upper boom pulleys, each coupled near an associated end of said upper boom;
        first and second lower boom pulleys, each coupled near an associated end of said lower boom;
        a cable forming a loop and extending around said first and second upper boom pulleys and said first and second lower boom pulleys, said cable having at least one elastic portion;
    a shock absorber coupled to said base; and
    a mast cable having a first cable end coupled to said mast pulley and a second cable end coupled to said shock absorber,
    wherein said shock absorber is configured to urge said mast to negatively rotate to a neutral position, but adapted to permit said mast to positively rotate not more than a controlled-tensioned position, in response to a tensioning of said mast cable and said urging of said shock absorber.

9. The UAV recovery system according to claim 8, characterized in that said shock absorber comprises:
a damper having a housing with a fluid cavity extending along a longitudinal axis and a rod slidably engaged with said fluid cavity and adapted to move relative to said housing along said longitudinal axis, said rod having a first rod end disposed within said fluid cavity and a second rod end traversing from said housing along said longitudinal axis;
an end plate coupled to said second rod end;
first and second mounts for coupling said shock absorber to said base, said first mount having a receptacle configured to engage with said housing;
a mast cable interface coupled to said second cable end of said mast cable;
a plurality of shafts coupled between said mast cable interface and said end plate, such that said end plate is in physical communication with said mast cable; and
a coil spring having a first spring end engaged with a spring seat of said housing and a second spring end engaged with said end plate for biasing said end plate away from said housing along said longitudinal axis, wherein said spring seat of said housing is engaged with said receptacle of said first mount, such that said coil spring is adapted to bias said end plate away from said first mount.

10. The UAV recovery system according to claim 9, further comprising:
a net coupled to said cable and extending somewhat vertically from said upper boom to said lower boom.

11. The UAV recovery system according to claim 10, characterized in that said base further comprises two wheel chocks extending laterally from said base.

12. The UAV recovery system according to claim 11, characterized in that said mast pulley comprises an adjustable mast cam, comprising:
one or more plurality of holes, each of said plurality of holes being spaced about and arranged radially away from said fixed axis of rotation; and
a plurality of radially adjustable pins adapted to engage with said one or more plurality of holes.

13. The UAV recovery system according to claim 12, characterized in that said upper boom and said lower boom are flexible.

14. The UAV recovery system according to claim 13, further comprising:
a guy wire having a first wire end coupled to an upper end of said mast and a second wire end coupled to said upper boom.

15. A UAV recovery system, comprising:
a mast coupled to a mast pulley having a swivel, said mast being vertically disposed and adapted to rotate about a fixed axis of rotation;
a base coupled to said swivel;
upper and lower booms extending somewhat horizontally from said vertically disposed mast;
a cable and pulley arrangement, comprising:
first and second upper boom pulleys, each coupled near an associated end of said upper boom;
first and second lower boom pulleys, each coupled near an associated end of said lower boom;
a cable forming a loop and extending around said first and second upper boom pulleys and said first and second lower boom pulleys, said cable having at least one elastic portion;
a mast cable having a first cable end coupled to said mast pulley;
a shock absorber, comprising:
a damper having a housing with a fluid cavity extending along a longitudinal axis and a rod slidably engaged with said fluid cavity and adapted to move relative to said housing along said longitudinal axis, said rod having a first rod end disposed within said fluid cavity and a second rod end traversing from said housing along said longitudinal axis;
an end plate coupled to said second rod end;
first and second mounts for coupling said shock absorber to said base, said first mount having a receptacle configured to engage with said housing;
a mast cable interface coupled to a second cable end of said mast cable;
a plurality of shafts coupled between said mast cable interface and said end plate, such that said end plate is in physical communication with said mast cable; and
a coil spring having a first spring end engaged with a spring seat of said housing and a second spring end engaged with said end plate for biasing said end plate away from said housing along said longitudinal axis, wherein said spring seat of said housing is engaged with said receptacle of said first mount, such that said coil spring is adapted to bias said end plate away from said first mount;
wherein said coil spring defines an inner diameter and is disposed about an outer periphery of said housing to permit axial movement of said housing within said inner diameter of said coil spring along said longitudinal axis; and
wherein said shock absorber is configured to urge said mast to negatively rotate into a neutral position, but adapted to permit said mast to positively rotate not more than a controlled-tensioned position, in response to a tensioning of said mast cable and said urging of said shock absorber.

16. The UAV recovery system according to claim 15, further comprising:
a net coupled to said cable and extending somewhat vertically from said upper boom to said lower boom.

17. The UAV recovery system according to claim 16, characterized in that said base further comprises two wheel chocks extending laterally from said base.

18. The UAV recovery system according to claim 17, characterized in that said mast pulley comprises an adjustable mast cam, comprising:
one or more plurality of holes, each of said plurality of holes being spaced about and arranged radially away from said fixed axis of rotation; and
a plurality of radially adjustable pins adapted to engage with said one or more plurality of holes.

19. The UAV recovery system according to claim 18, characterized in that said upper boom and said lower boom are flexible.

20. The UAV recovery system according to claim 19, further comprising:
a guy wire having a first wire end coupled to an upper end of said mast and a second wire end coupled to said upper boom.

* * * * *